(12) United States Patent
Brune et al.

(10) Patent No.: US 7,586,307 B2
(45) Date of Patent: Sep. 8, 2009

(54) LOCATING ARRANGEMENT AND METHOD USING BORING TOOL AND CABLE LOCATING SIGNALS

(75) Inventors: Guenter W. Brune, Bellevue, WA (US); Albert W. Chau, Woodinville, WA (US); John E. Mercer, Kent, WA (US)

(73) Assignee: Merlin Technology, Inc., Renton, WA (US)

( * ) Notice: Subject to any disclaimer, the term of this patent is extended or adjusted under 35 U.S.C. 154(b) by 0 days.

(21) Appl. No.: 12/121,671

(22) Filed: May 15, 2008

(65) Prior Publication Data

US 2008/0246481 A1    Oct. 9, 2008

Related U.S. Application Data

(62) Division of application No. 11/437,228, filed on May 19, 2006, now Pat. No. 7,391,216, which is a division of application No. 10/808,918, filed on Mar. 24, 2004, now abandoned, which is a division of application No. 09/934,370, filed on Aug. 22, 2001, now Pat. No. 6,737,867.

(51) Int. Cl.
*G01V 3/08* (2006.01)
*G01V 3/38* (2006.01)
(52) U.S. Cl. .................. 324/326; 324/67; 324/338
(58) Field of Classification Search ......... 324/326–329, 324/207.11, 207.12, 207.26, 332–346, 67; 166/250.01, 255.1; 175/40, 45
See application file for complete search history.

(56) References Cited

U.S. PATENT DOCUMENTS

| | | | |
|---|---|---|---|
| 2,908,863 | A | 10/1959 | Neff |
| 3,617,865 | A | 11/1971 | Hakata |
| 3,746,106 | A | 7/1973 | McCullough et al. |
| 4,520,317 | A | 5/1985 | Peterman |
| 4,806,869 | A | 2/1989 | Chau et al. |
| 5,150,056 | A | 9/1992 | Wilcock |
| 5,231,355 | A | 7/1993 | Rider et al. |
| 5,337,002 | A | 8/1994 | Mercer |

(Continued)

OTHER PUBLICATIONS

Radiodetection Limited, Radiodetection Trenchless Products—Drill Check, Apr. 1990, Radiodetection Limited Tradeshow Handout.

(Continued)

*Primary Examiner*—Reena Aurora
(74) *Attorney, Agent, or Firm*—Pritzkau Patent Group, LLC

(57) ABSTRACT

An arrangement and an associated method are described in which a boring tool is moved through the ground within a given region along a path in which region a cable is buried. The boring tool and the cable transmit a boring tool locating signal and a cable locating signal, respectively. Intensities of the boring tool locating signal and the cable locating signal are measured along with a pitch orientation of the boring tool. Using the measured intensities and established pitch orientation, a positional relationship is determined to relative scale including at least the boring tool and the cable in the region. The positional relationship is displayed to scale in one view. The positional relationship may be determined and displayed including the forward locate point in scaled relation to the boring tool and the cable. Cable depth determination techniques are described including a two-point ground depth determination method.

12 Claims, 12 Drawing Sheets

U.S. PATENT DOCUMENTS

| | | | |
|---|---|---|---|
| 5,914,602 | A | 6/1999 | Mercer |
| 5,933,008 | A | 8/1999 | Mercer |
| 6,160,401 | A | 12/2000 | Mercer |
| 6,191,585 | B1 | 2/2001 | Mercer et al. |
| 6,232,780 | B1 | 5/2001 | Mercer |
| 6,373,252 | B1 | 4/2002 | Eslambolchi et al. |
| 6,496,008 | B1 | 12/2002 | Brune et al. |

OTHER PUBLICATIONS

C. A. Young, Measuring the Depth of Buried Cable, Nov. 1965, Bell Laboratiories Record, vol. 43, No. 10, pp. 399-401.

A. Garnett, No. Dig. 85, Apr. 1985, Electrolocation Ltd. Brochure, London, UK, p. 1-10.

LOCATING ARRANGEMENT AND METHOD USING BORING TOOL AND CABLE LOCATING SIGNALS

This application is a divisional application of U.S. patent application Ser. No. 11/437,228 filed May 19, 2006, now U.S. Pat. No. 7,391,216, which is a divisional application of U.S. patent application Ser. No. 10/808,918 filed Mar. 24, 2004, now abandoned; which is a divisional application of U.S. patent application Ser. No. 09/934,370 filed Aug. 22, 2001 and now issued as U.S. Pat. No. 6,737,867 on May 18, 2004; the disclosures of which are incorporated herein by reference.

BACKGROUND OF THE INVENTION

The present invention relates generally to a system including a locating arrangement for tracking a boring tool and one or more buried lines such as, for example, pipes, cables, conduits or other conductors and, more particularly, to a locating arrangement configured for receiving a boring tool locating signal and at least one cable locating signal for determining at least one scaled positional relationship based, at least in part, on the received locating signals.

The installation of utility lines underground is increasingly popular for reasons of aesthetics and for practical reasons such as, for example, protecting these lines from the effects of severe above ground weather conditions. In areas where buried lines have previously been installed, however, it is undesirable to excavate an entire pathway for the purpose of installing additional lines since such excavation many times results in the unintentional damage of an existing utility line. Areas which include buried fiber optic cables are particularly problematic for several reasons. First, a fiber optic cable is difficult to repair once it has been severed or damaged. Second, because a fiber optic cable is capable of simultaneously carrying a vast amount of information, downtime can be quite costly.

In the past, various horizontal drilling systems, including locating and monitoring systems, have been developed which advantageously eliminate the need for excavating the entire pathway in which a utility line is to be installed. The attendant locating and monitoring systems serve in tracking the position of the boring tool and may further serve in tracking the position of one or more buried obstacles such as, for example, utility lines. While these prior art systems are generally suited for their intended purpose, it is submitted that a majority of prior art approaches do not integrate boring tool and cable locating data. That is, the prior art generally views cable locating and boring tool tracking as entirely separate activities wherein, for example, a handheld portable locator operates in a selected one of a cable locating mode or a boring tool tracking mode. See, for example, a conference paper describing a cable locating technique based on the so-called gradient method as reported by C. A. Young ("Measuring the depth of buried cables", Bell Laboratories Record, Vol. 43, No. 10, November 1965).

One approach that does integrate cable and boring tool locating signal data is described in copending U.S. patent application Ser. No. 09/641,006, entitled FLUX PLANE LOCATING IN AN UNDERGROUND DRILLING SYSTEM which is commonly assigned with the present application and which is incorporated herein by reference. While this approach is highly effective and provides sweeping advantages over the state-of-the-art as of its filing date, it is submitted that still further enhancements are possible.

Another concern with regard to the prior art resides in locator configurations useful in depth determination of buried cables. In particular, the prior art locator includes a wand which extends below the locator when held by an operator. A lowermost end of the wand may be placed on the surface of the ground during a depth measurement. The configuration of the wand includes antennas at spaced apart positions within the extension of the wand and directed to the task of depth determination. It is submitted that the need for the wand provides a locator having an unwieldy, oversized configuration. See, for example, a technical paper entitled "Alternating Magnetic Field technology for Locating Buried Utility Lines and for Providing Information for No Dig Techniques", presented in April 1985 at the NO Dig Conference in London, UK, showing a "wand" locator configured for a 2 point height determination having separate, spaced apart antennas in the wand.

The present invention provides a highly advantageous enhanced locating arrangement and associated method configured for cable and boring tool locating in a way that has heretofore been unknown and which provides still further advantages, for example, related to cable depth determination, as will be described.

SUMMARY OF THE INVENTION

As will be described in more detail hereinafter, an arrangement and an associated method are described for use in an overall system in which a boring tool is moved through the ground within a given region along a path and in which region a pre-existing cable is buried. The boring tool and the cable transmit a boring tool locating signal and a cable locating signal, respectively, such that the boring tool locating signal and the cable locating signal are distinguishable each from the other. Intensities of the boring tool locating signal and the cable locating signal are measured in a predetermined way using a locator. A pitch orientation of the boring tool is established. Using the measured intensities and established pitch orientation, a positional relationship is determined to relative scale including at least the boring tool and the cable in the region. In one feature, the positional relationship is displayed to scale in one view. In another feature, the boring tool locating signal exhibits a forward locate point at the surface of the ground and the positional relationship is determined including the forward locate point in scaled relation to the boring tool and the cable.

In another aspect of the present invention, within an overall system in which a boring tool is moved through the ground within a given region along a path and in which region a cable is buried, a locating arrangement comprises a first arrangement for transmitting a boring tool locating signal from the boring tool. A second arrangement, forming part of the locating arrangement, transmits a cable locating signal from the cable such that the boring tool locating signal and the cable locating signal are distinguishable each from the other. The locating arrangement further includes a locator for measuring intensities of the boring tool locating signal and the cable locating signal in a predetermined way and configured for establishing a pitch orientation of the boring tool and for using the measured intensities and established pitch orientation to determine a positional relationship to relative scale including at least the boring tool and the locator. In one feature, the locator includes a display arrangement configured for display of the positional relationship. In another feature, the boring tool locating signal exhibits a forward locate point at the surface of the ground and the positional relationship is determined including the forward locate point in scaled relation to the boring tool and the cable.

In still another aspect of the present invention, within a system for locating an in-ground cable in a region using a cable locating signal which is transmitted from the length of the cable, a locator is disclosed for use in sensing a first locating signal strength at a first operator determined distance generally in vertical alignment with an overhead surface position, which is generally overhead of the cable, in conjunction with measuring the first operator determined distance. The locator is moved to a second operator determined distance from the overhead surface position generally in vertical alignment with the overhead surface position. A second locating signal strength is sensed at the second operator determined distance in conjunction with measuring the second operator determined distance from the overhead surface position. The depth of the cable is determined using the first and second signal strengths and the first and second distances.

In yet another aspect of the present invention, within a system for locating an in-ground cable in a region using a locating signal which is transmitted from the length of the cable, a method is disclosed for determining the depth of the cable using a locator. Accordingly, at a first point with reference to the surface of the ground, a generally horizontal locating direction is defined toward a second point. A first intensity of the cable locating signal is measured at the first point with the locator oriented toward the second point along the locating direction. The locator is moved to the second point. A second intensity of the cable locating signal is measured at the second point. A distance between the first and second points is determined along the locating direction. Using the measured first and second intensities and the determined distance between the first and second points, the depth of the cable is determined.

In an additional aspect of the present invention, within a system for locating an in-ground cable in a region using a locating signal which is transmitted from the length of the cable, a locator for determining the depth of the cable is described. The locator includes a first arrangement for sensing a signal strength of the locating signal and a processing arrangement cooperating with the first arrangement and configured for using (i) a first signal strength measured at a first point with reference to the surface of the ground with the locator oriented in a generally horizontal locating direction toward a second point, (ii) a second signal strength measured at the second point and (iii) a distance determined between the first and second points to determine the depth of the cable.

In a further aspect of the present invention, within a system for locating an in-ground cable in a region using a locating signal which is transmitted from the length of the cable, a method is described for determining the depth of the cable using a locator comprising the steps of (i) at a first point with reference to the surface of the ground, defining a generally horizontal locating direction toward a second point, (ii) measuring a first intensity of the cable locating signal at the first point with the locator oriented toward the second point along the locating direction, (iii) moving the locator to the second point, (iv) measuring a second intensity of the cable locating signal at the second point, (v) determining a distance between the first and second points along the locating direction, and (vi) using the measured first and second intensities and the determined distance between the first and second points, determining the depth of the cable.

In another aspect of the present invention, within a region which includes at least one generally straight cable in the ground and extending across the region, from which cable a locating signal is transmitted, a method is disclosed comprising the steps of measuring a local flux intensity, including three orthogonally opposed values of the locating signal at an above ground point within the region using a portable locator, using the local flux intensity to establish an approximate horizontal distance to the cable based on (i) a vertically oriented component of the locating signal at the above ground point determined from the local flux intensity and (ii) a horizontally oriented component of the locating signal at the above ground point determined from the local flux intensity, which horizontally oriented component is generally normal to the cable in a plan view and represents a total flux intensity in a horizontal plane.

In yet another aspect of the present invention, within a system for use in a region which includes at least one generally straight cable in the ground and extending across the region, from which cable a locating signal is transmitted, a locator is described. The locator includes a first arrangement for measuring a local flux intensity, including three orthogonally opposed values, of the locating signal at an above ground point. A processing arrangement forms part of the locator for using the local flux intensity to establish an approximate horizontal distance to the cable in a plan view based on (i) a vertically oriented component of the locating signal at the above ground point determined from the local flux intensity and (ii) a horizontally oriented component of the locating signal at the above ground point determined from the local flux intensity, which horizontally oriented component is generally normal to the cable in a plan view and represents a total flux intensity in a horizontal plane.

In still another aspect of the present invention, within a system for locating an in-ground cable in a region using a cable locating signal which is transmitted from the length of the cable, a method is disclosed for determining the depth of the cable. A first locating signal strength is sensed, using a locator, at a first operator determined distance generally in vertical alignment with a surface position which is horizontally displaced with respect to any position directly overhead of the cable. The first operator determined distance from the surface position is measured with the locator. The locator is moved to a second operator determined distance from the surface position generally in vertical alignment with the surface position and sensing a second locating signal strength at the second operator determined distance. The second operator determined distance is measured from the surface position. A horizontal distance is measured from the surface position to a point directly overhead of the cable in a direction that is normal to a surface projection of the cable. The depth of the cable is determined using the first and second locating signal strengths, the first and second distances and the measured horizontal distance.

In yet another aspect of the present invention, within a system for locating an in-ground cable in a region using a cable locating signal which is transmitted from the length of the cable, a locating arrangement is described. The locating arrangement includes a first arrangement for sensing a signal strength of the locating signal at an operator determined distance from a surface position on the ground. A second arrangement forms part the locating arrangement for measuring the operator determined distance from the surface position. A processing arrangement cooperates with the first and second arrangements and is configured for accepting (i) a first signal strength, measured at a first operator determined distance generally vertically above a particular surface position on the ground which is horizontally displaced with respect to any position directly overhead of the cable, and (ii) a second signal strength, measured at a second operator determined distance generally vertically above the particular surface position, and configured for determining a depth of the cable using the first and second signal strength measurements and the first and second operator determined distances.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 1:
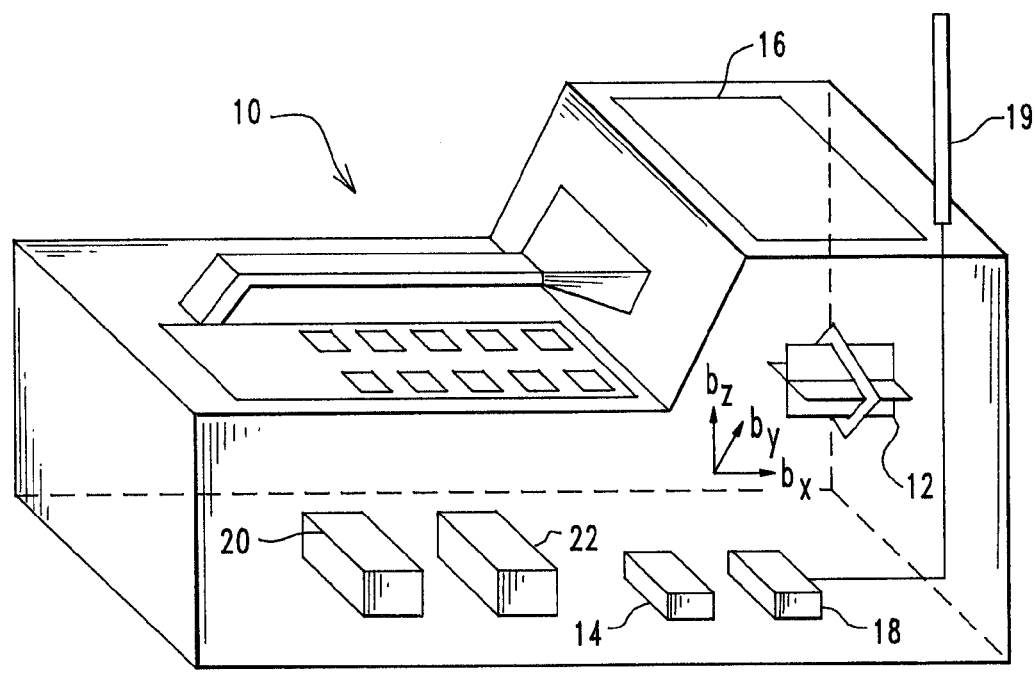
FIG. 1 is a diagrammatic perspective view of a locator produced in accordance with the present invention shown here to illustrate various components of the locator.

Turning now to the drawings, wherein like items are indicated by like reference numbers throughout the various figures, attention is immediately directed to FIG. 1 which illustrates one embodiment of a portable locator, generally indicated by the reference number 10 and configured in accordance with the present invention. Locator 10 includes a three-axis antenna cluster 12 measuring three orthogonally arranged components of magnetic flux in locator fixed coordinates. One useful antenna cluster contemplated for use herein is disclosed by U.S. Pat. No. 6,005,532 entitled ORTHOGONAL ANTENNA ARRANGEMENT AND METHOD which is commonly assigned with the present application and is incorporated herein by reference. A tilt sensor arrangement 14 is provided for measuring gravitational angles from which the components of flux in a level coordinate system may be determined. Locator 10 further des a graphics display 16, a telemetry arrangement 18 having an antenna 19 and a microprocessor 20 interconnected appropriately with the various components. Other components may be added as desired such as, for example, an azimuth sensor in the form of a tri-axial magnetometer 22 to aid in position determination relative to a selected direction such as the drilling direction and ultrasonic transducers (not shown) for measuring the height of the locator above the surface of the ground. One highly advantageous ultrasonic transducer arrangement is described, for example, in U.S. Pat. No. 6,232, 780 which is commonly assigned with the present application and is incorporated herein by reference.

For purposes of simplification of the present description, it is initially assumed that any buried cable being located is straight and is positioned at a constant depth below a level ground surface. Of course, the cable locating signal may be transmitted from a tracer wire that is associated with the buried cable. Removal of these assumptions will be considered at appropriate points below.

A boring tool (not shown) suitable for use in the locating system of the present invention includes an axially arranged dipole antenna which transmits the boring tool locating signal in the form of a dipole field. It is also assumed that the boring tool is configured, as needed, for sensing and transmitting the pitch of the boring tool. Transmission of pitch and other values may be accomplished, for example, by modulating the information onto the boring tool locating signal. Alternatively, such data may be transmitted using the drill string having, in one implementation, a conductive wire arrangement housed within the drill string. Highly advantageous arrangements for accomplishing the latter are described in U.S. Pat. No. 6,223,826 entitled AUTO-EXTENDING/RE-TRACTING ELECTRICALLY ISOLATED CONDUCTORS IN A SEGMENTED DRILL STRING and copending U.S. patent application Ser. No. 09/793,056, both of which are commonly assigned with the present application and are hereby incorporated by reference.

Figure 2:
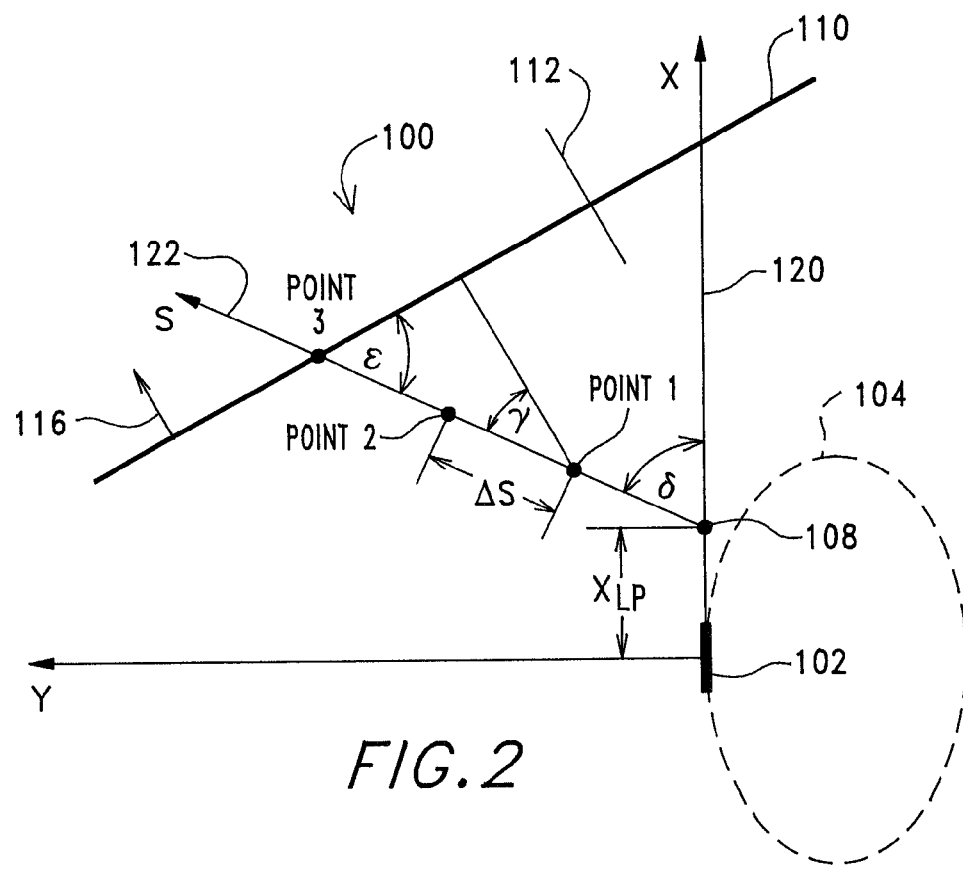
FIG. 2 is a diagrammatic plan view of a region including a buried cable and a boring tool performing a drilling operation, shown here to illustrate a scaled positional relationship method of the present invention wherein a positional relationship between a boring tool and an in-ground cable is determined.

Referring to FIG. 2 in conjunction with FIG. 1, a region 100 is shown including a boring tool 102 which transmits a dipole locating field 104 that is received by antenna cluster 12 of FIG. 1. Region 100 is shown in plan view. Boring tool 102 is at the origin of an xyz coordinate system where the x and y axes define a horizontal xy plane. The x axis is coincident with an axis of symmetry of a dipole antenna (not shown) which transmits the boring tool locating signal and which forms part of the boring tool, assuming the latter is at zero pitch. The positive or forward direction of the x axis (upward in the plan view of FIG. 2) may alternatively be referred to as the drilling direction which may, in turn, be projected upward to the surface of the ground. The z axis is not shown but extends normally outward in a positive direction from the plane of the figure. Accordingly, a forward locate point 108 is present at or proximate to the surface of the region, as described, for example, in U.S. Pat. No. 5,337,002 entitled LOCATOR DEVICE FOR CONTINUOUSLY LOCATING A DIPOLE MAGNETIC FIELD TRANSMITTER AND ITS METHOD OF OPERATION which is commonly assigned with the present application and is incorporated herein by reference. A rear locate point is also present at the surface of the ground, but has not been illustrated for purposes of clarity. Locator 10 is configured in a suitable manner for finding the locate points. One highly advantageous configuration of the locator directed, at least in part, to finding the locate points is described in above incorporated copending U.S. application Ser. No. 09/641,006.

Continuing with a description of FIG. 2, region 100 further includes a cable 110 which transmits a cable locating signal 112. As is also described in above incorporated copending U.S. application Ser. No. 09/641,006, the cable locating field is two-dimensional, characterized by a pattern of flux lines surrounding the cable which appear as lines (only one of which is shown) normal to cable 110 in the plan view of FIG. 2. The flux lines immediately above the cable line at the surface of the ground accordingly are normal to its plan-view, as indicated by a flux vector 116. Having established the position of the forward locate point in a suitable manner, a highly advantageous procedure may be employed for the purpose of creating a view of region 100 which has not previously been available, as will be described.

Referring to FIGS. 1 and 2, a drilling direction 120 is recorded for future reference by orienting locator 10 along the drilling direction and, thereafter, reading an azimuth angle from magnetometer 22. In this regard, antenna cluster 12 is oriented having a receiving axis arranged along an axis of symmetry of the locator. Of course, the azimuth angle of the drilling direction may be recorded at any time so long as the drilling direction has been established and prior to a need to use the azimuth angle in subsequent determinations. With the drilling direction recorded, a locating direction 122 is then established having a heading generally in the direction of cable 110. Positions with respect to the locating direction are designated with reference to an s coordinate axis having its origin at the forward locate point and positive values in the locating direction. The general direction of the cable may be established in any suitable manner. One highly advantageous technique is described in above incorporated, copending U.S. application Ser. No. 09/641,006, entitled FLUX PLANE LOCATING IN AN UNDERGROUND DRILLING SYS- TEM with reference to its FIGS. 10 and 11. Another highly advantageous technique will be described at an appropriate point below.

From the locate point, the operator moves the locator generally in the locating direction (the positive s direction) toward the cable to a Point 1. The preferred approach to the cable is in a direction normal to the direction of the cable, however, deviation from this approach remains highly effective as illustrated by the example of FIG. 2. The angle ϵ shown in the figure should always be chosen such that the cable induced fluxes at points 1 and 2 are distinct. Point 1 is at an arbitrary distance from the locate point as determined by the operator. The x and y coordinates of Point 1 are $x_1,y_1$ while its s coordinate is $s_1$. The positions of points 1 and 2 with respect to the forward locate point and the cable are ultimately determined by the signal strengths of the transmitter and the cable. Signal to noise ratio for transmitter and cable must be sufficiently high to permit accurate measurements of their respective fluxes. As described below, among other variations, Point 1 may coincide with the forward locate point wherein the distance from the locate point is, of course, zero.

Upon establishing Point 1, readings of both the cable locating signal and the boring tool locating signal are taken at Point 1 to establish flux components of both signals. Additionally, the heading of the locating direction is recorded with the locator oriented therealong using a reading of magnetometer 22. The heading of the locating direction is denoted as an angle δ shown between the drilling direction and the locating direction in FIG. 2. Considering the orientation of the cable, an angle γ is determined and recorded which represents a direction to the cable that is normal to the cable from Point 1. Accordingly, an angle $\epsilon=90°+\gamma$ is defined in the xy plane between the direction in which the cable extends and the locating direction. The determination of γ is made based on a horizontal plane flux line orientation exhibited by the cable locating signal, as will be further described below.

Having completed the foregoing procedures at Point 1, the operator proceeds to move the locator in the locating direction to a Point 2. This latter point may be at a somewhat arbitrary distance from Point 1, but the general criterion on how to select its position relative to transmitter and cable described above applies. The x and y coordinates of Point 2 are $x_2,y_2$ while its s coordinate is $s_2$. The distance between Points 1 and 2 is indicated as Δs. It should be noted that the z coordinate, $z_3$, of these points is equal to the depth of the boring tool, since a level ground surface is assumed.

Coordinates of Points 1 and 2, in the xyz and s coordinate systems, may be determined using the recorded flux intensities established for the boring tool locating signal at Points 1 and 2 based upon the dipole equations in conjunction with measured pitch of the boring tool, horizontal distance, $x_{LP}$, between the boring tool and the forward locate point, angle δ, and a determined depth $D_T$ of the boring tool determined, for example, using the boring tool locating signal based on the dipole equations in a known manner.

With continuing reference to FIGS. 1 and 2, the s coordinates of Points 1 and 2 may be determined using:

$$s_1^2 = (x_1 - x_{LP})^2 + y_1^2 \quad (1)$$

$$s_2^2 = (x_2 - x_{LP})^2 + y_2^2 \quad (2)$$

under the condition that s=0 at the forward locate point. The value of Δs is given by:

$$\Delta s = s_2 - s_1 \quad (3)$$

The coordinates $s_3$ and $x_3,y_3$ ($z_3=D_T$, the depth of the boring tool) may be determined, in view of equations 1-3, by solving the equations:

$$s_3 = s_1 + \frac{D_c}{\cos\gamma} \frac{b_{w1}}{b_{h1}} \quad (4)$$

$$x_3 = x_{LP} + s_3 \cos\delta \quad (5)$$

$$y_3 = s_3 \sin\delta \quad (6)$$

where $b_{w_1}$ and $b_{h_1}$ are components of the cable locating signal determined at the first point with $b_{w_1}$ being an intensity component normal to the xy plane and $b_{h_1}$ a total intensity component of the cable locating signal in the plane of the ground, $s_1$ represents the s coordinate of the first point, $s_2$ represents the s coordinate of the second point, $x_1,y_1$ represents the xy coordinates of the first point, $x_2,y_2$ represents the xy coordinates of the second point, $x_{LP}$ represents the x coordinate of the forward locate point and $D_c$ is the depth of the cable. The latter may be determined in any suitable manner; however, at least one highly advantageous technique is described below.

A number of possible approaches may be used in order for the locator to distinguish between the signal from the boring tool transmitter and one or more buried cable lines. For example, a different frequency may be used for each item being located or tracked. The same tri-axial receiving antenna 12 (see FIG. 1) may be used to receive all the employed frequencies. A digital signal processing receiver is used to extract the signal amplitudes for each antenna and frequency. Alternatively, different sets of receiving devices may be used. In any case, a microprocessor is configured for processing the data for display. In the case of AC power cables, with separated neutrals, the signal naturally emanating from the AC cable may be used as the cable locating signal. If more than one cable is present, however, a different frequency for each cable may be employed. The location data for each cable may be presented alone or in combination with the location data for other cables.

One alternative to multiple frequency use is the use of time multiplexed signals that are synchronized at the locator. Such multiplexing may be used for the cable lines in the ground or may include the boring tool transmitter as well. Combinations of multiple frequencies and time multiplexing are also contemplated.

Figure 2A:
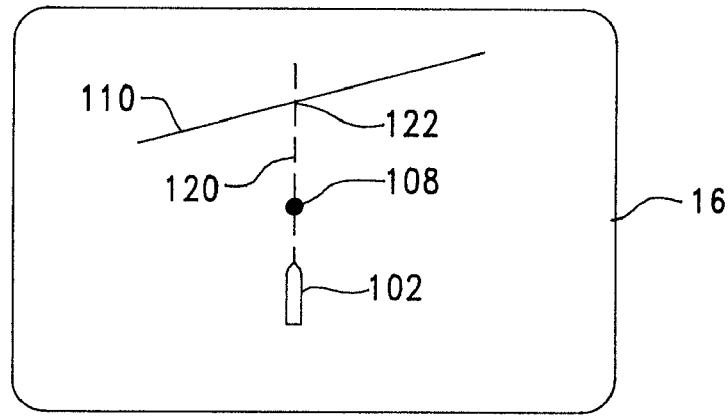
FIG. 2A is a diagrammatic illustration of a screen display provided, for example, on the locator of FIG. 1, showing the scaled positional relationship determined in accordance with the present invention.

Turning to FIG. 2A, having established the location of Point 3 directly above the cable, it is important to note that all information necessary to producing a scaled view of region 100 has been determined. Accordingly, FIG. 2A illustrates one possible appearance of display 16 on locator 10 showing a scaled view of region 100 including the relative positions of boring tool 102, forward locate point 108 and cable 110. The drilling path is indicated using a dashed line 120 which is seen to intersect cable 110 at a potential collision point 122 that is dead ahead of the boring tool along the drilling path. This feature, in and by itself, is considered to be highly advantageous. That is, the illustration on display 16 provides the operator with an invaluable illustration of the distance to the potential collision point with cable 110. Since the operator has also determined the location of the forward locate point as well as the position of the boring tool, the scaled display serves to establish and illustrate the relative distance to the potential collision point in terms of horizontal distance $X_{LP}$ (see FIG. 2) between the boring tool and the forward locate point. The scaled display and method of generating essentially establishes two positional relationships which are scaled relative to one another: a first positional relationship between the boring tool and the locator and a second positional relationship between the cable and the locator. Boring tool locating signal data and cable locating signal data are used cooperatively in order to derive the described advantages.

It should be appreciated that displays other than the plan view of FIG. 2a may be produced. For example, an elevational view (not shown) may be generated which illustrates the current depth of the boring tool relative to the depth of the cable which lies ahead. Accordingly, the operator may cause the boring tool to maintain its current depth or to be steered either upward or downward in order to avoid a collision with the cable, assuming that the operator's choice is to continue drilling straight ahead in plan view.

With the foregoing procedure in mind, it should be appreciated that various steps forming portions of the procedure may be modified in suitable ways. For example, it is not a requirement for Point 1 and Point 2 to be on the near side of cable 110 with respect to the boring tool. These points may be on opposite sides of cable 110. In another modification, mentioned above, Point 1 may coincide with the forward locate point. In this instance, Point 2 may be between Point 1 and the cable or, alternatively, on the opposite side of the cable. As another modification, Points 1 and 2 may both be on the opposite side of the cable with respect to the boring tool and forward locate point. The procedure is also applicable in situations where the forward locate point and boring tool are on opposite sides of the cable. In view of these modifications, it should be appreciated that the locating procedure of the present invention described above remains effective essentially irrespective of the initial layout in the drilling region.

Referring to FIG. 2, if the foregoing scaled view locating procedure is performed using a locator that does not incorporate a magnetometer, the procedure may be modified by selecting the locating direction as one of the drilling direction ($\delta=0°$) and a direction that is normal to the drilling direction ($\delta=90°$). The preferred direction should be selected as the one of these two choices which most closely approaches normal to the cable. That is, angle $\epsilon$ is closest to 90°.

Figure 3:
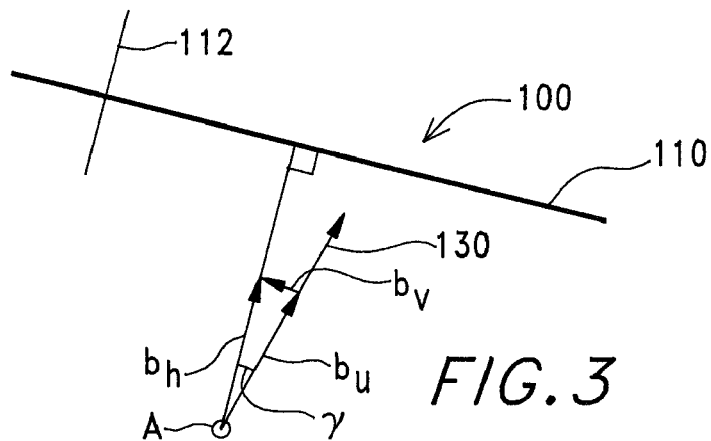
FIG. 3 is a diagrammatic view of a region in which an in-ground cable is positioned, shown here illustrate a determination of a heading toward the cable.
Figure 4:
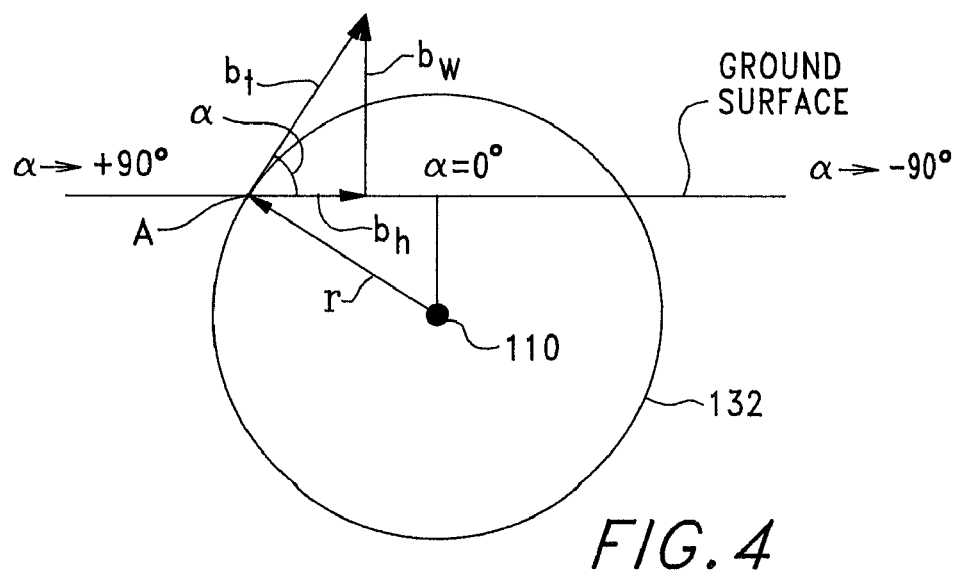
FIG. 4 is another diagrammatic view of the region shown in FIG. 3 providing an elevational end view of the in-ground cable, shown here to illustrate further details of the determination of the cable heading.

Turning to FIGS. 3 and 4, attention is now directed to a highly advantageous procedure for determining a heading toward cable 110 in region 100 using the locator of the present invention. This procedure is appropriate for performing a preliminary survey of a drilling region or for use when a boring tool locating signal is not available for some reason. As an example of the latter, the locator may be out of range of the boring tool for purposes of boring tool locating signal reception. Moreover, the heading toward the cable may be determined in this manner within the context of any locating procedure, as needed. Cable 110 is again assumed to be generally straight at a constant distance beneath the surface of the ground. As illustrated in FIG. 3, the locator is at a point A and flux components $b_u$ and $b_v$ of cable locating signal 112 are measured in a horizontal plane proximate to the surface of the ground. Component $b_u$ is parallel to an orientation direction 130 along which the axis of symmetry of the locator is assumed to be oriented while component $b_v$ is normal to orientation direction 130. FIG. 4 is an illustration of an end view of cable 110 showing a circular flux line 132 of the cable locating signal. Comparing FIGS. 3 and 4 shows that flux components $b_u$ and $b_v$ may be added as vectors to produce a total flux magnitude in the horizontal plane which is indicated as $b_h$. That is, a total horizontal plane flux magnitude is determined as:

$$b_h = \sqrt{b_u^2 + b_v^2} \tag{7}$$

An angle $\gamma$, shown in FIG. 3, formed between the locator's orientation or locating direction and normal to the cable, is defined as:

$$\tan\gamma = \frac{b_v}{b_u} \tag{8}$$

It is noted that this definition is consistent with angle $\gamma$ of FIG. 2 such that $\gamma$ may be determined using equation (8).

Referring to FIG. 4, a radial distance r extends from the cable to point A. The total flux intensity of the cable locating signal is indicated as $b_t$ and is given by:

$$b_t = \sqrt{b_h^2 + b_w^2} \tag{9}$$

where $b_w$ is the vertically oriented component of the locating signal as determined using the locator. An angle $\alpha$ is defined, as shown at point A, in a direction that is normal to radial distance r measured between the radial distance and a horizontal plane 134 which coincides with the ground surface in the present example. Hence, $$\tan\alpha = \frac{b_w}{b_h} = \frac{b_w}{b_u} \frac{1}{\sqrt{1+\left(\frac{b_v}{b_u}\right)^2}} \tag{10}$$

Angle $\gamma$ gives the normal direction to the cable from point A while the angle $\alpha$ is used in estimating the horizontal distance to the cable. With regard to $\alpha$ it is noted that $\alpha$ goes to plus and minus 90° at an infinite distance in opposing directions from the cable. Thus, the sign of $\alpha$ determines whether the cable is ahead of or behind the locator. At a point directly overhead of the cable $\alpha$ is equal to 0°.

Figure 5:
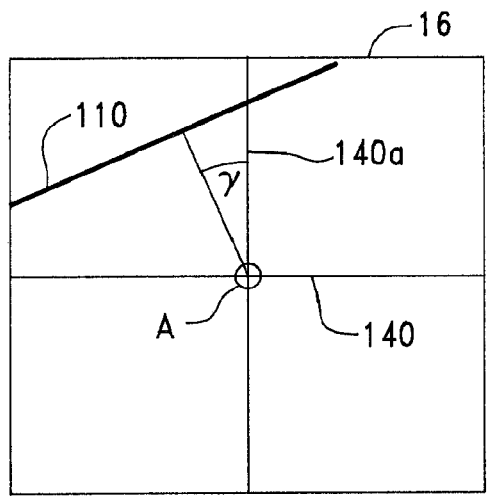
FIG. 5 is a representation of a screen display provided, for example, on the locator of the present invention, diagrammatically showing one possible display of an in-ground cable in relation to the locator wherein the cable is generally ahead of the locator.

Referring to FIG. 5, by knowing the direction to the cable and having a basis for distance measurement, screen 16 of locator 10 is used to display the location of the cable relative to the locator. A set of crosshairs 140 is shown at the intersection of which is the locator position. The orientation axis of the locator coincides with a vertical crosshair axis 140a. Angle $\gamma$ need not be shown in the actual display but is shown here in order to assist the reader's understanding of the illustration. Approaching the cable at some angle $\gamma$ will show the cable in the upper two quadrants defined by the crosshairs.

Figure 6:
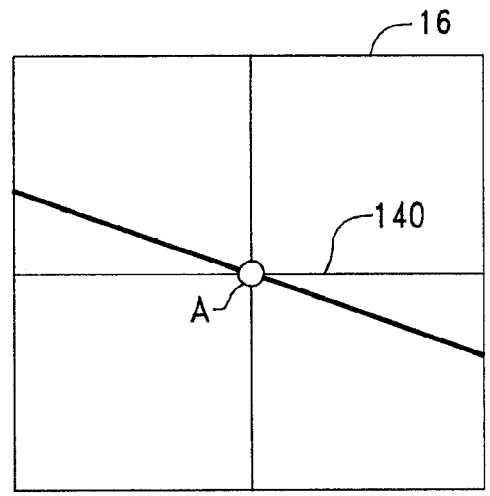
FIG. 6 is another representation of a screen display provided, for example, on the locator of the present invention, diagrammatically showing one possible display of an in-ground cable in relation to the locator wherein the cable is generally overhead of one point along the length of the cable.

FIG. 6 illustrates display 16 with the locator positioned immediately above the cable. Accordingly, virtual cable 110 is shown crossing the center of the display, intersecting the crosshairs at an angle based on $\gamma$. The angular orientation of the cable, of course, depends on the direction in which the locator is oriented. The task of locating a cable, per this procedure, simply requires an operator to move the locator in a way which moves the line representing the cable to the center of the display. This can be accomplished by approaching the cable along any convenient path, which need not be straight.

Figure 7:
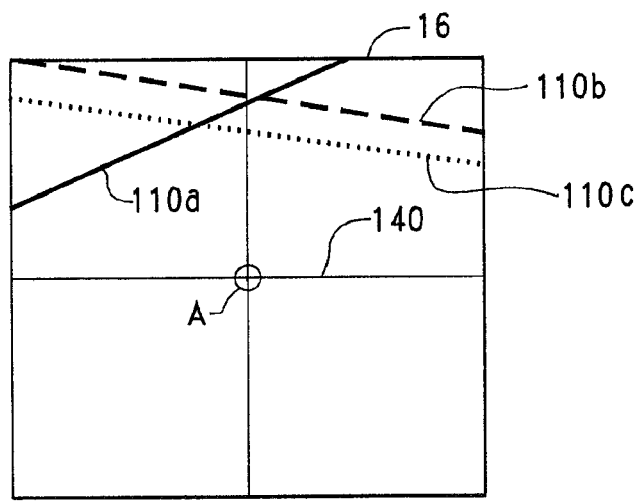
FIG. 7 is yet another representation of a screen display provided, for example, on the locator of the present invention, diagrammatically showing one possible display associated with a region which includes a plurality of in-ground cables in relation to the locator.

Turning to FIG. 7, a plurality of cables may be displayed simultaneously so long as the respective cable locating signals are distinguishable, each from the others in some suitable manner. For example, each cable locating signal may be emanated at a different frequency. FIG. 7 illustrates the appearance of display 16 showing three cables 110a-c simultaneously displayed using a different display appearance for each cable.

Attention is now directed to a number of highly advantageous techniques for use in determining cable depth. It is noted that all of the depth determination techniques described herein are compatible for use with locator 10, which includes tri-axial antenna arrangement 12 (see FIG. 1) configured for measuring flux components at a single point. Moreover, as described, locator 10 includes a sensing arrangement for measuring the distance from the locator to the surface of the ground which provides for appreciable convenience in the execution of these depth determination techniques as well as in the execution of other locating techniques such as those described above.

Figure 8:
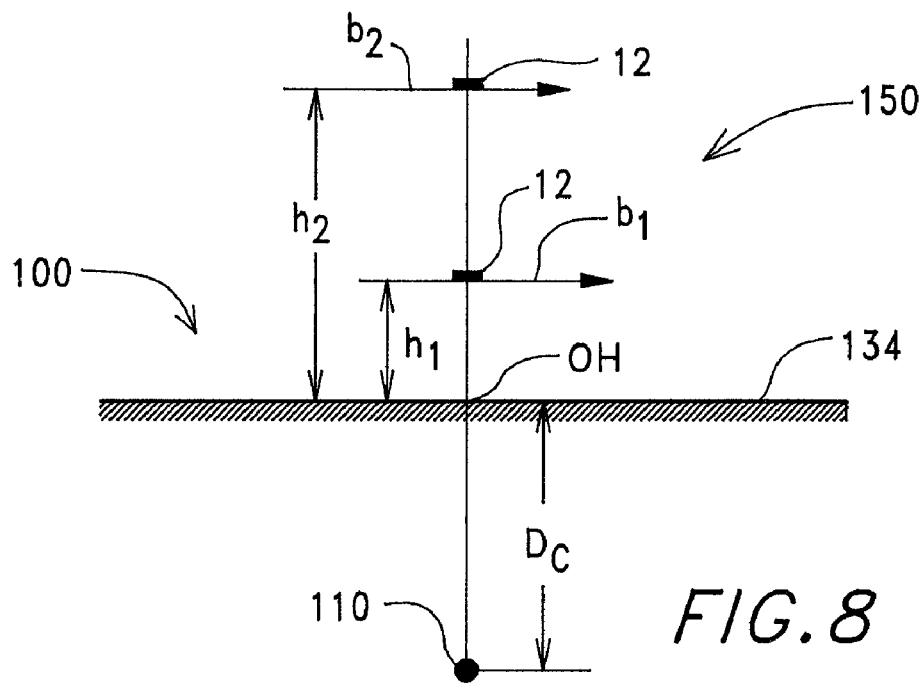
FIG. 8 is a diagrammatic elevational view of an in-ground cable, shown here to illustrate a two-point overhead height technique for depth determination using first and second operator determined distances above the surface of the ground.

Referring to FIG. 8, a first depth determination technique is referred to as a two-point overhead height method and is generally indicated by the reference number 150. An elevational view, taken in cross-section, shows region 100 including cable 110 beneath surface of the ground 134, which is considered as a horizontally extending plane. The total flux of the cable locating signal and distance to the ground are measured at 2 different heights, $h_1$ and $h_2$, directly overhead of the cable, representing two distances from the cable. At each height, the total flux intensity $b_1$ and $b_2$, respectively, is inversely proportional to the distance between receiver and cable. Each distance includes height above ground $h_1$ or $h_2$ plus the cable depth $D_c$. The latter may be determined from:

$$D_c = \frac{h_2 b_2 - h_1 b_1}{b_1 - b_2} \quad (11)$$

It is important to understand that $h_1$ and $h_2$ are operator determined distances which are readily measured by locator 10 using its ultrasonic distance measuring configuration. No constraints are placed on the operator with regard to selecting these heights, thereby permitting flexibility. Moreover, a compact locator is provided, having eliminated any need to provide spaced apart antenna arrangements directed to the purpose of depth determination.

Figure 9:
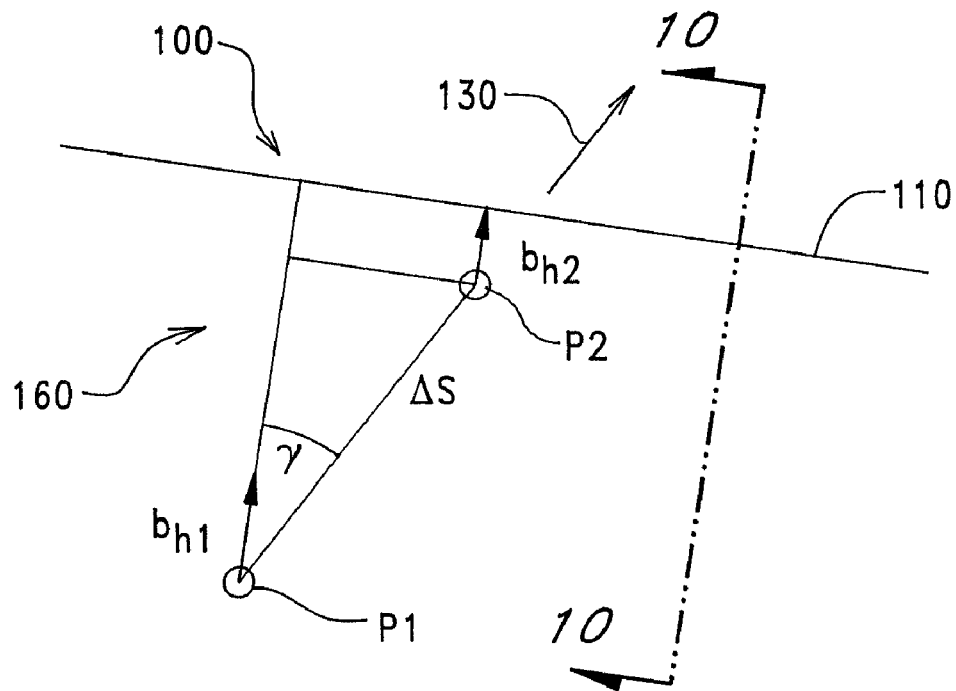
FIG. 9 is a diagrammatic plan view of an in-ground cable, shown here to illustrate a highly advantageous two-point ground method for depth determination performed in accordance with the present invention.

Referring to FIG. 9 with supplemental reference to FIG. 3, a second depth determination technique is referred to as a two-point ground method and is generally indicated by the reference number 160. A plan view is shown which illustrates cable 110 in region 100. A first measurement of cable locating signal flux is conducted at a position P1 adjacent to the cable with the locator pointing to a position P2. This will provide angle γ as described with regard to FIG. 3, above, using $$\tan\gamma = \frac{b_{v_1}}{b_{u_1}} \quad (12)$$

$b_{v_1}$ and $b_{u_1}$ represent horizontal plane components of the cable locating signal at P1 which add vectorially to produce $b_{h_1}$. The latter is determined by:

$$b_{h_1} = \sqrt{b_{u_1}^2 + b_{v_1}^2} \quad (13)$$

Subsequently, locator 10 is moved to position P2. A distance, Δs, is measured between P1 and P2. Where a boring tool locating signal is unavailable for purposes of position determination, any suitable length measuring technique may be used, even including that of approximating 3 feet by the step of an average person. At position P2, the components of horizontal flux are recorded as $b_{v_2}$ and $b_{u_2}$ and used to calculate total horizontal flux from $$b_{h_2} = \sqrt{b_{u_2}^2 + b_{v_2}^2} \quad (14)$$

Since, at point P2, the fluxes are not used to determine an angle, the receiver may be oriented in any convenient horizontal direction as the fluxes are measured.

Figure 10:
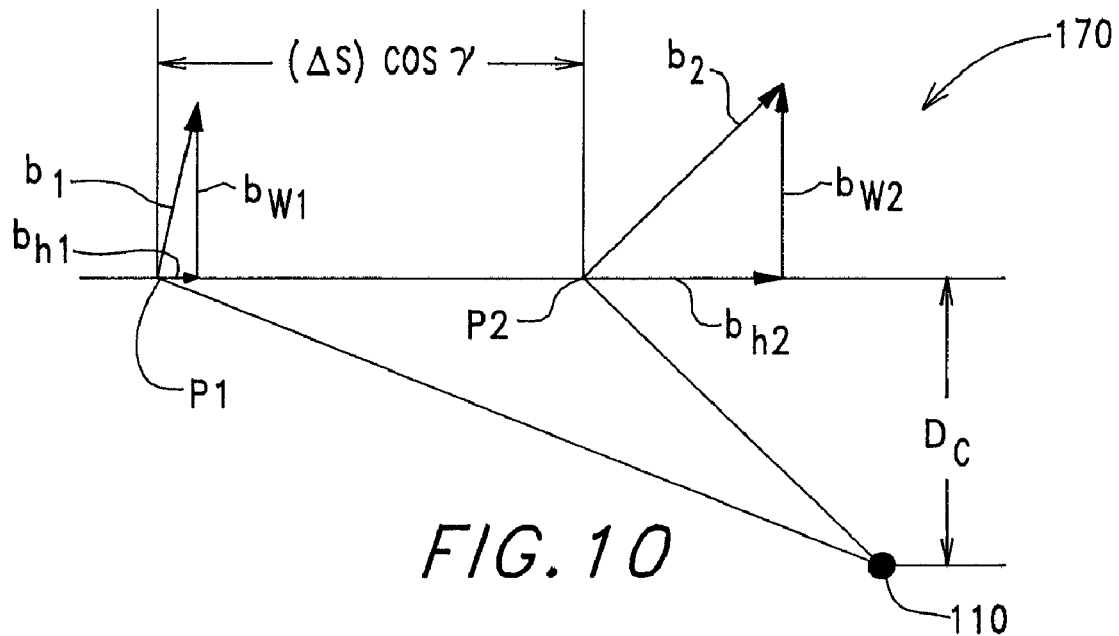
FIG. 10 is a diagrammatic end view of the cable of FIG. 9, taken along a line 12-12, showing the positional relationship between the cable and selected flux components.

FIG. 10 is an end view of region 100 showing cable 110 and the positional arrangement which obtains between the cable and the flux components at the two points. Triangulation in FIG. 10, in view of FIG. 9, provides the following formula for cable depth in which all variables have been defined and determined as described above:

$$D_c = \frac{(\Delta s)\cos\gamma}{\dfrac{b_{w_1}}{b_{h_1}} - \dfrac{b_{w_2}}{b_{h_2}}}. \quad (15)$$

The two-point ground method for depth determination may be performed in several different ways with regard to the placement of points P1 and P2 with respect to cable 110. For example, the points may be arranged to one side of the cable in plan view. As another example, the points may be arranged on opposite sides of the cable. The latter is considered to be highly advantageous for particular reasons that will be described at an appropriate point in the remaining discussions.

Figure 11:
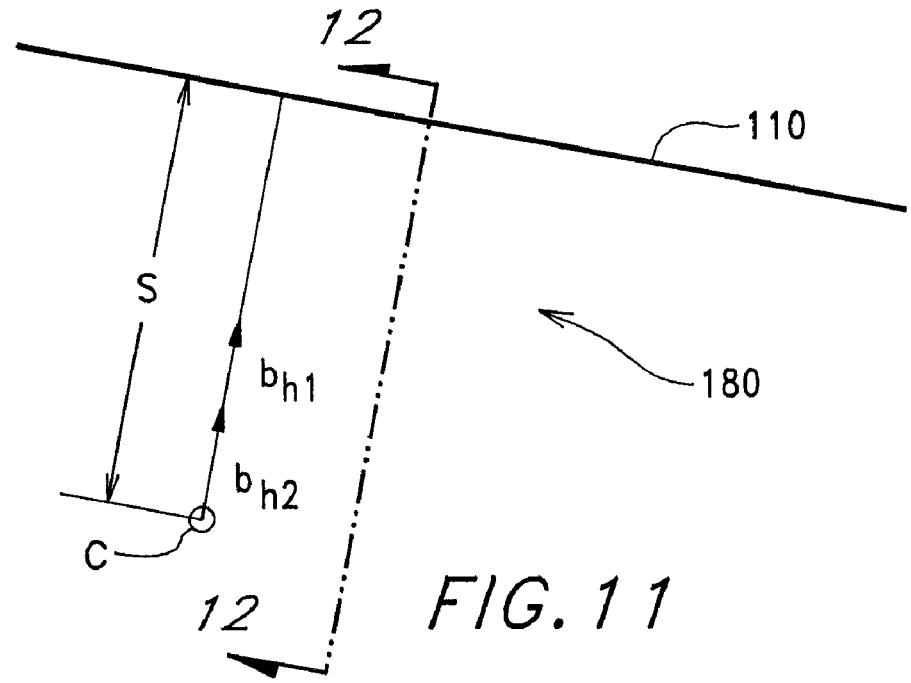
FIG. 11 is a diagrammatic plan view of an in-ground cable shown here to illustrate a two-point offset height technique for depth determination using first and second operator determined distances above the surface of the ground in accordance with the present invention.
Figure 12:
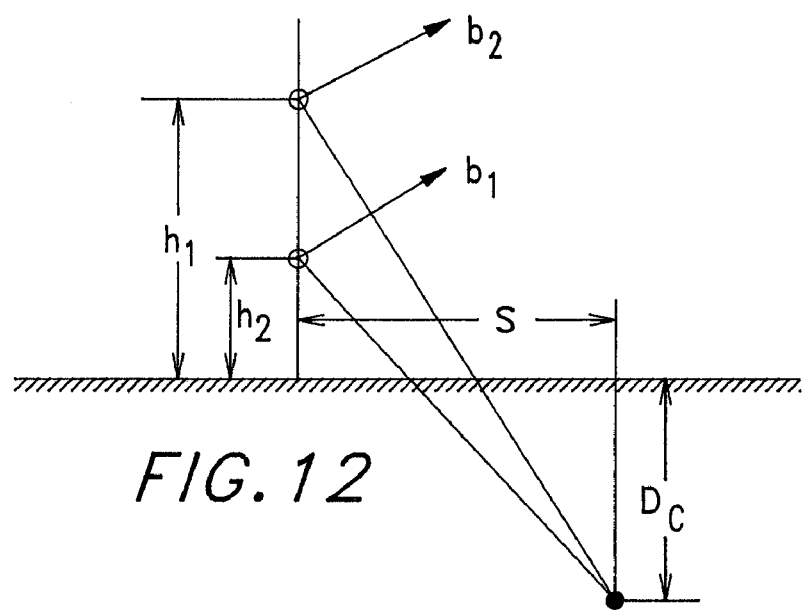
FIG. 12 is a diagrammatic end view, in elevation, of the in-ground cable of FIG. 11, taken along a line 12-12, shown here to illustrate selected cable locating signal flux components relative to the cable and the surface of the ground.

With reference to FIGS. 11 and 12, a third cable depth determination technique is illustrated, generally referred to by the reference number 180, and may be referred to as the two-point offset height method of the present invention. FIG. 11 is a plan view of region 100 showing cable 110 and a point C on the surface of the ground laterally displaced with respect to any point which is directly overhead of the cable. FIG. 12 is an elevational view in cross-section showing cable 110 and point C laterally displaced from directly overhead of the cable. Locator 10 of FIG. 1 is used to conduct measurements in general vertical alignment with point C at two different heights above the ground, $h_1$ and $h_2$. At each height, three flux components are measured as well as distance to the ground. It is noted that s is the distance normal to the cable measured along a level ground surface and may be determined in any suitable manner including, but not limited to using a boring tool locating signal or actual measurement which may, for example, be paced off based on the operator's stride. The total fluxes at heights $h_1$ and $h_2$ follow from $$b_1^2 = b_{u_1}^2 + b_{v_1}^2 + b_{w_1}^2 \quad (16)$$

$$b_2^2 = b_{u_2}^2 + b_{v_2}^2 + b_{w_2}^2 \quad (17)$$

where $b_1$ and $b_2$ represent the total flux at $h_1$ and $h_2$. Individual flux components are not shown for purposes of clarity, but may readily be understood by referring to FIG. 3. Accordingly, $b_u$ is a horizontal flux component along the axis of symmetry of the locator including the appropriate number subscript, $b_v$ is a horizontal flux component normal to the axis of symmetry of the locator including the appropriate number subscript and $b_w$ is a vertical flux component normal to the assumed horizontal ground plane including the appropriate number subscript for each height. It should be mentioned that these various flux components may be determined with locator 10 in an arbitrary orientation since the locator may determine the desired horizontal plane and vertical flux components from actual measurements with reference, for example, tilt sensor arrangement 14.

As seen in FIG. 12, slant distances for each height, $r_1$ and $r_2$ are defined as:

$$r_1^2 = s^2 + (D_c + h_1)^2 \qquad (18)$$

$$r_2^2 = s^2 + (D_c + h_2)^2 \qquad (19)$$

Since the total flux is inversely proportional to slant distance:

$$\frac{b_1}{b_2} = \frac{r_2}{r_1} \qquad (20)$$

Based on the foregoing, the following quadratic equation for cable depth $D_c$ is obtained:

$$\left(\frac{b_1}{b_2}\right)^2 = \frac{s^2 + (D_c + h_2)^2}{s^2 + (D_c + h_1)^2} \qquad (21)$$

Equation (24) can be solved using any of several standard methods satisfying the requirement $D_c > 0$.

The foregoing examples have assumed a level ground surface and a straight cable at a constant depth in the ground. The cable position, in plan view, is identified as that location on or somewhat above the surface of the ground at which the flux of the cable locating signal is horizontally oriented. Removal of these assumptions will be considered immediately hereinafter.

Figure 13:
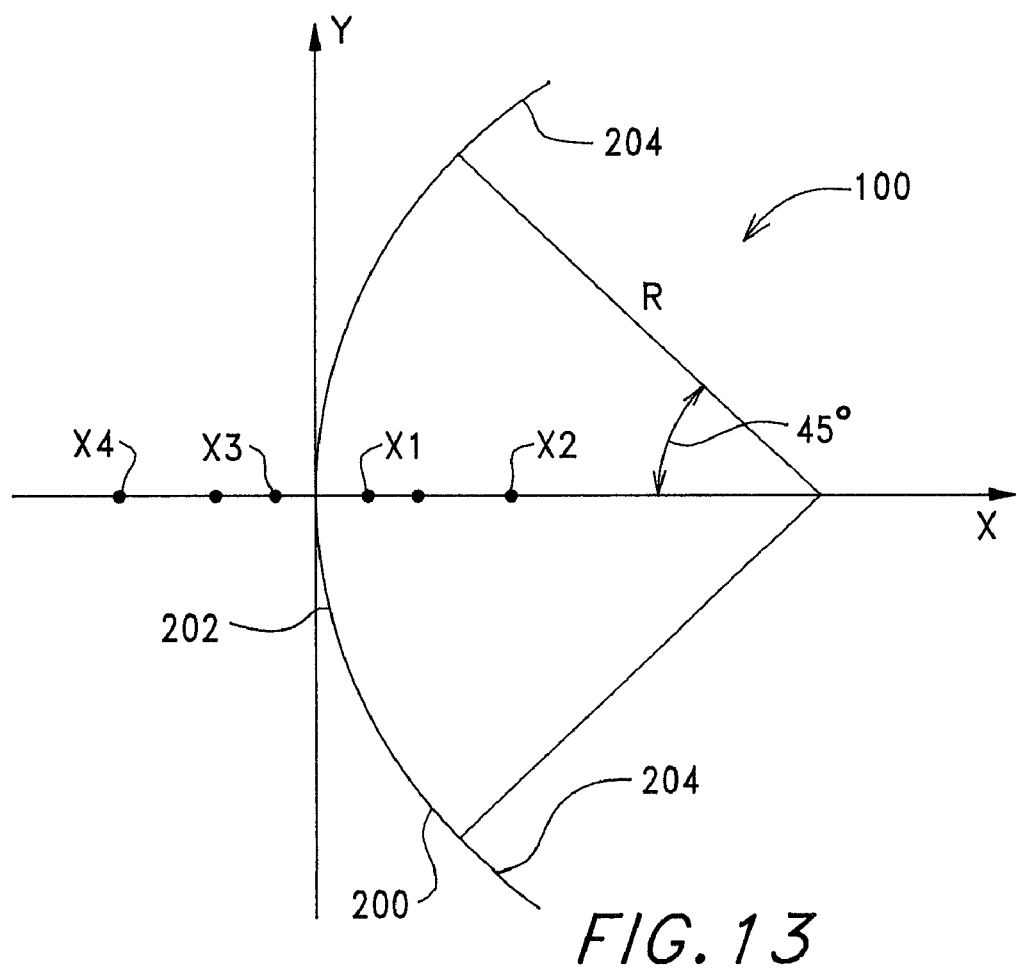
FIG. 13 is a diagrammatic plan view of an in-ground cable installed having a curved configuration in a horizontal xy coordinate system shown here for use in facilitating a description of the influence of the curved configuration on depth and position locating.

Referring to FIG. 13, where the ground surface and/or cable depth change somewhat gradually, cable position determination is not likely to experience significant inaccuracy. A more difficult situation arises, however, if the cable is curved even though a constant depth is maintained. Cable curvature of this kind is addressed herein using the cable geometry shown in a plan view in FIG. 13 wherein a cable 200 in region 100 includes a curved portion (quarter circle) 202, at each end of which an infinitely long straight cable segment 204 is attached. The curved cable defines a horizontal xy plane. The magnetic field surrounding this cable is determined from a solution of the law of Biot-Savart in which the curved part of the cable is represented by forty segments (not shown) of equal length. The solution determines all positions in a horizontal plane at or slightly above the ground surface at which the locating flux is horizontally oriented.

Figure 14:
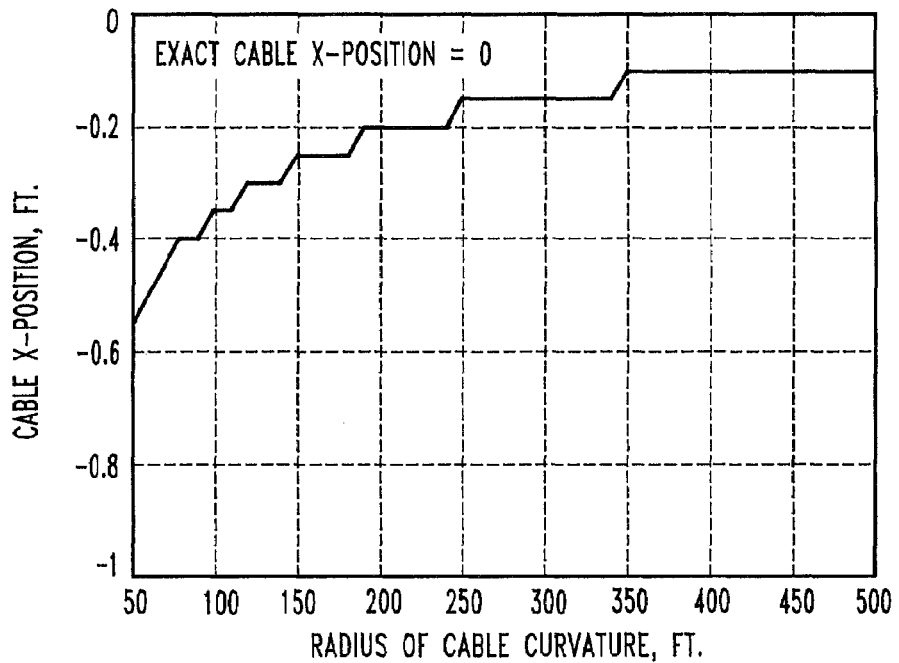
FIG. 14 is a plot of determined cable position versus radius of cable curvature for the cable of FIG. 13, shown here to illustrate cable position determination accuracy with changing curvature.

Attention is now directed to FIG. 14 in which the x coordinate of cable position is plotted along the vertical axis against the radius of cable curvature along the horizontal axis varying from 50 feet to 500 feet for a cable depth of 5 feet. The y coordinate is set to the value zero. As seen in FIG. 13, the actual x coordinate of the cable for y=0 is x=0. The worst case value of the x position coordinate occurs at the tightest radius of curvature, 50 feet, exhibiting an error of approximately −0.55 feet in the x coordinate position. As the radius of curvature increases, the value determined for the x coordinate more closely approaches x=0.1 feet. In all cases, the x coordinate is shifted at least slightly in the negative direction away from the actual curved cable (x<0). Accordingly, especially for radii of cable curvature larger than 100 feet, the error appears to be essentially negligible.

Figure 15:
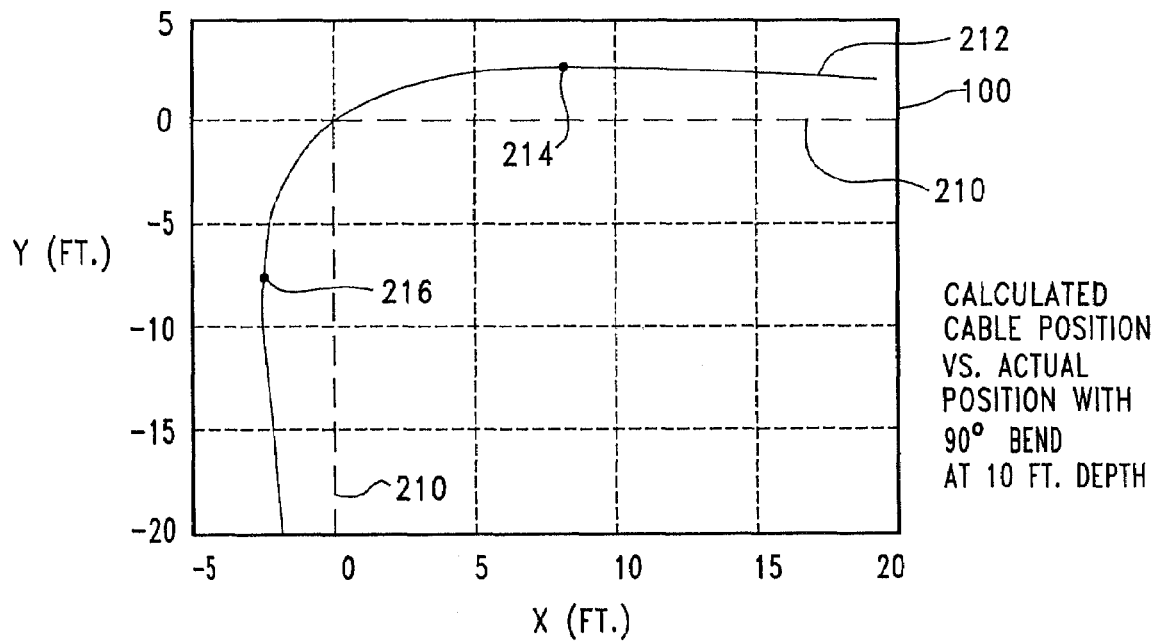
FIG. 15 is a diagrammatic plan view of a region including an in-ground cable installed at a 10 foot depth, further having an abrupt 90° directional change and still further illustrating positions at which a locator, configured for indicating a horizontal locating signal flux, indicates the position of the cable for comparison with the actual cable position as influenced by the 90° bend.

Referring to FIG. 15, larger deviations between actual and observed cable position may be expected if the cable suddenly changes direction even without changing depth. FIG. 15 shows region 100 having a cable 210, indicated as a dashed line arranged along the x and y axes with a sharp 90 degree bend at the origin of the coordinate system. The cable is installed at a constant 10 foot depth. The magnetic field surrounding the cable was again derived from the law of Biot-Savart. Consistent with the previous example, the cable position is determined by finding all points above or at the ground surface where the flux of the cable locating signal is horizontal. The calculated position of the cable is indicated as a solid line 212. FIG. 15 shows the indicated cable position to deviate in the worst case from the actual position by up to 2.5 feet at points 214 and 216. It is noted that the location of the cable at the 90 degree bend itself is determined accurately.

Figure 16:
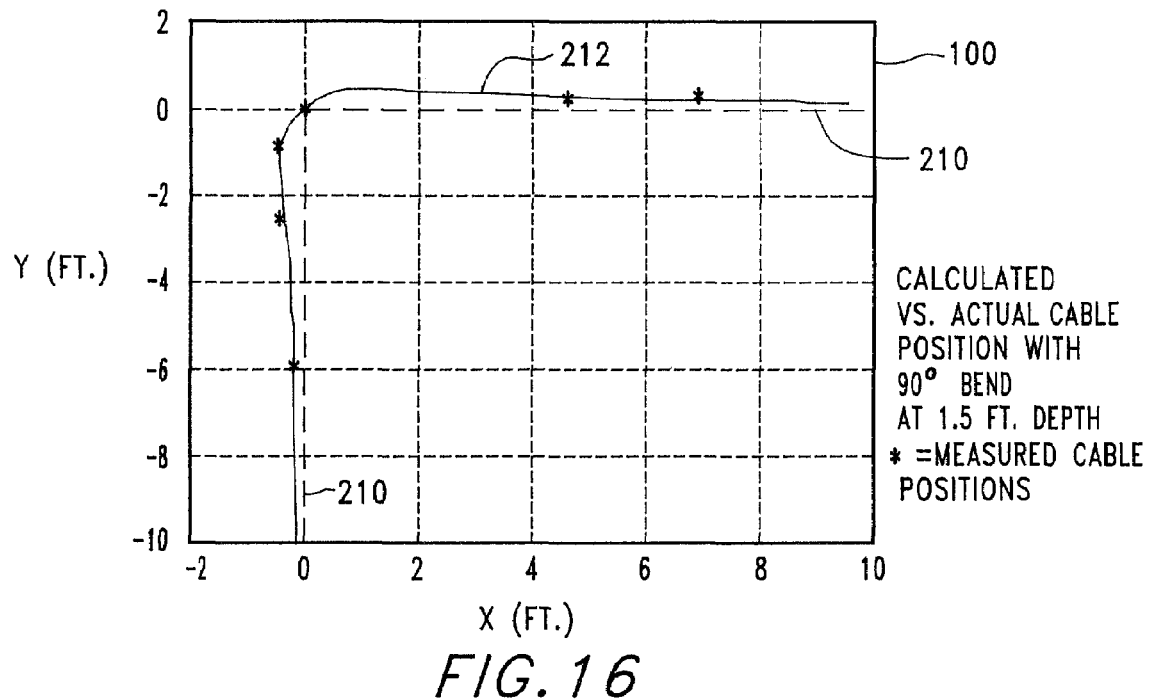
FIG. 16 is a diagrammatic plan view of a portion of the region of FIG. 15, but with the cable installed at a 1.5 foot depth, illustrating that the locator indicated position of the cable differs from the actual cable position near the 90° bend by a few inches but agrees well with calculated data.

FIG. 16 is a plan view similar to that of FIG. 15 which illustrates results of the calculations as performed with regard to FIG. 15, but for a 1.5 foot cable depth. The calculated position of the cable is again indicated by the reference number 212. As distance increases from the bend, the indicated cable position approaches the actual cable location. In the present example, the small value of cable depth was chosen to facilitate empirical measurements using an actual walk-over locator manufactured by Digital Control Incorporated. Each cable position determined using the locator is indicated by an asterisk (*). As is apparent from the figure, measured data and results from the mathematical model agree remarkably well thereby serving to confirm the validity of the simulation.

Having described three different depth measurement techniques in the foregoing discussions, attention is now directed to consideration of the accuracy of these methods with the introduction of cable curvature. Initially, the two-point ground depth determination method of the present invention will be considered. To that end, the effect of cable curvature on the use of the two-point ground method is determined based on equation (15). For the curved cable configuration shown in FIG. 13 with the cable at a depth of 5 feet, depth is calculated using fluxes obtained from the described mathematical simulation of the magnetic field.

Figure 17:
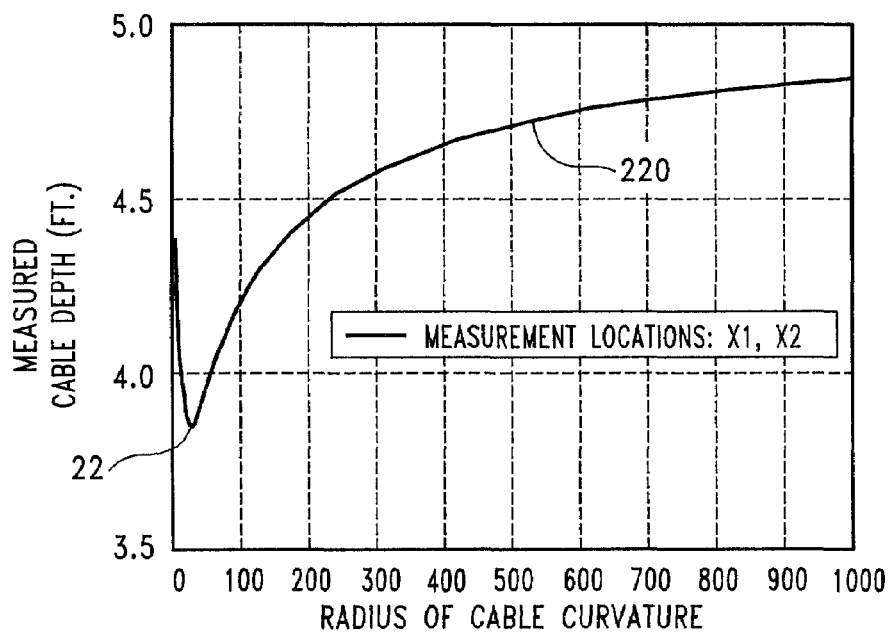
FIG. 17 is a plot of measured cable depth versus radius of cable curvature for the curved cable configuration shown in FIG. 13, illustrating the effect of cable curvature on depth determination using the two-point ground depth determination method of the present invention having both measurement points along the x axis on one side of the cable and within the curved configuration of the cable.

Turning to FIGS. 13 and 17, the cable depth is determined using points x1 and x2, indicated on the x axis of FIG. 13 where x1 is at 5 feet and x2 is at 15 feet in the positive direction, such that both of the points are to one side of cable 202. FIG. 17 illustrates determined cable depth, indicated as a plot 220, plotted against a wide range of radii of cable curvatures from 0-1000 feet along the horizontal axis. It is noted that a negative peak 22 in the plot represents an error of more than 20% in the determined depth for a curvature having a radius of approximately 40 feet. For larger radii of curvature, the depth more closely approaches 5 feet with error becoming essentially negligible. Measured depth is less than the actual depth in all cases.

Figure 18:
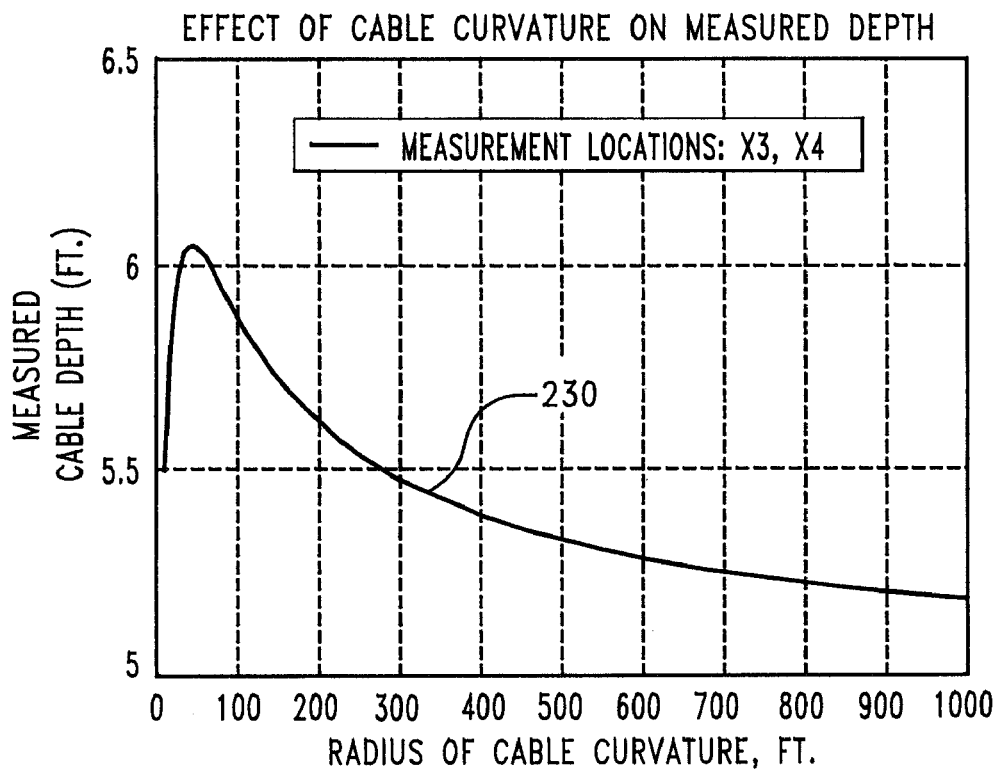
FIG. 18 is a plot of measured cable depth versus radius of cable curvature produced consistent with the manner in which the plot of FIG. 17 is produced and again using the two-point ground depth determination method of the present invention, having, however, both measurement points at opposite points on the x axis outside the curved configuration of the cable shown here to illustrate influence on determined depth.

Referring to FIGS. 13 and 18, cable depth measurements are taken at x3, which is at −5 feet with respect to the origin, and at x4, which is at −15 feet with respect to the origin. Thus, the measurement positions are at mirror image positions on the x axis with regard to the previous example. Cable depth is again plotted as a plot 230 against the range of radius of curvature. Comparison of plot 220 of FIG. 17 with plot 230 shows some difference which is attributable to the measurement points being outside the curvature of the cable.

Figure 19:
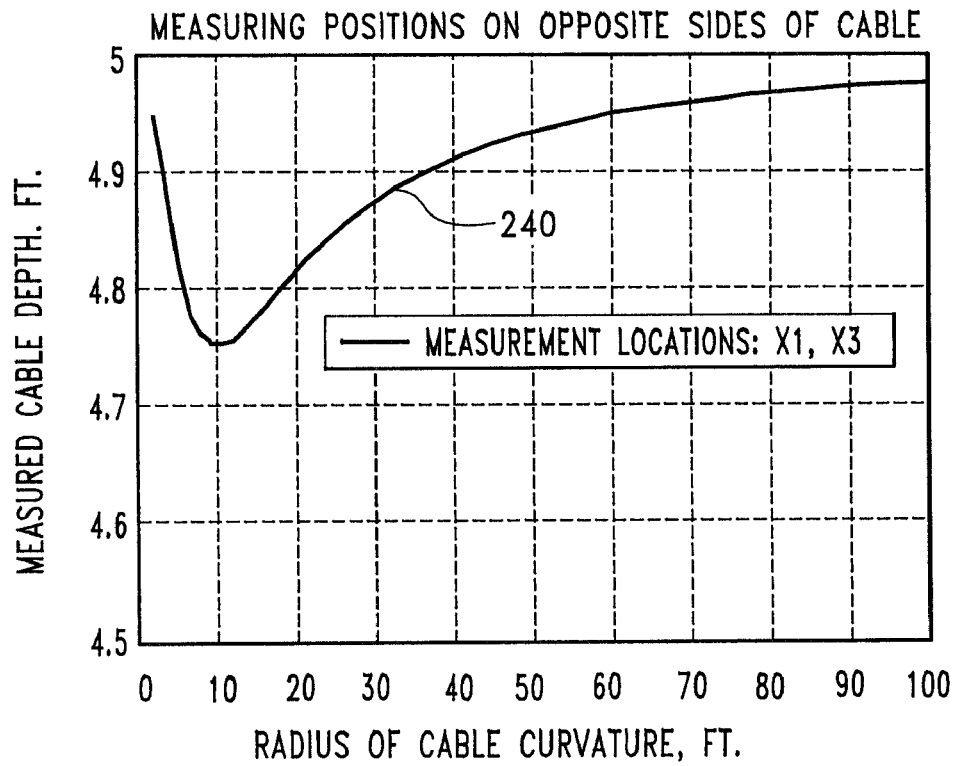
FIG. 19 is a plot of measured cable depth versus radius of cable curvature produced consistent with the manner in which the plot of FIG. 17 is produced and again using the two-point ground depth determination method of the present invention, having, however, the measurement points on opposite sides of the cable as well as opposite sides of the x axis, shown here to illustrate influence on determined depth for comparison with FIGS. 17 and 18.

Considering FIGS. 13 and 19, cable depth measurements are taken at x1 and x3 at plus and minus five foot distances, respectively, from the origin on opposite sides of cable 202. Cable depth is here plotted as a plot 240 against the range of radius of curvature from 0 to 100 feet. Measured depth is again lower than actual depth. Remarkably, the worst case error in the depth determination is substantially reduced to a value of approximately 5%. Hence, depth measurement using measurement points on opposing sides of the cable is considered to be highly advantageous with regard to error introduced as a result of cable curvature. It should also be mentioned that the depth measurement error approaches zero (see FIGS. 17-19) as the radius of curvature approaches infinity, irrespective of the arrangement of the measurement points on only one or opposing sides of the cable. The reason for this characteristic can be found in cable depth equation 15, which is exact for straight and level cables and applies to an approximation for curved cables.

Figure 20:
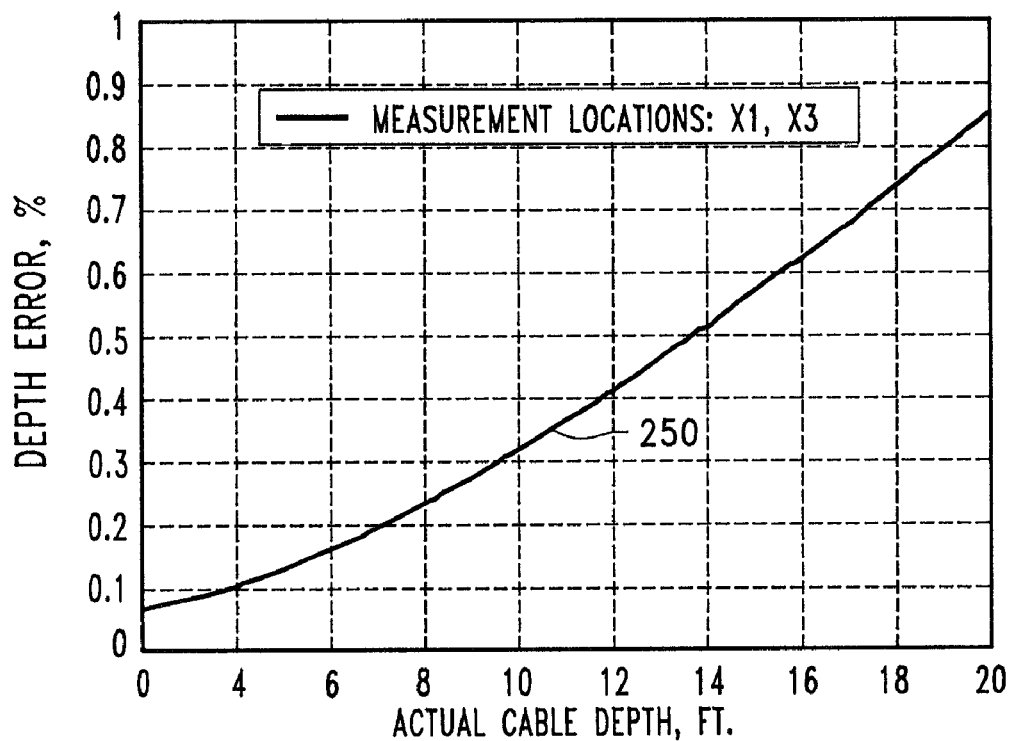
FIG. 20 plots depth error, as a percentage of depth, against actual cable depth for a curved in-ground cable installed according to FIG. 13 having a radius of curvature of 200, feet shown here to illustrate a depth error of less than 1% over a depth range of 2-20 feet for measurement points on opposite sides of the cable along the x axis.

FIG. 20 shows a plot 250 of depth error along the vertical axis as a percentage of actual cable depth on the vertical axis against actual cable depth on the horizontal axis in the range of 0-200 feet, as determined using the highly advantageous two-point ground depth determination method of the present invention employing the opposing side measurement points at x1 and x3. A cable bend radius of 200 feet is used. As is apparent from the plot, depth error resulting from cable curvature is readily maintained below 1% across a typical range of depth values.

Figure 21:
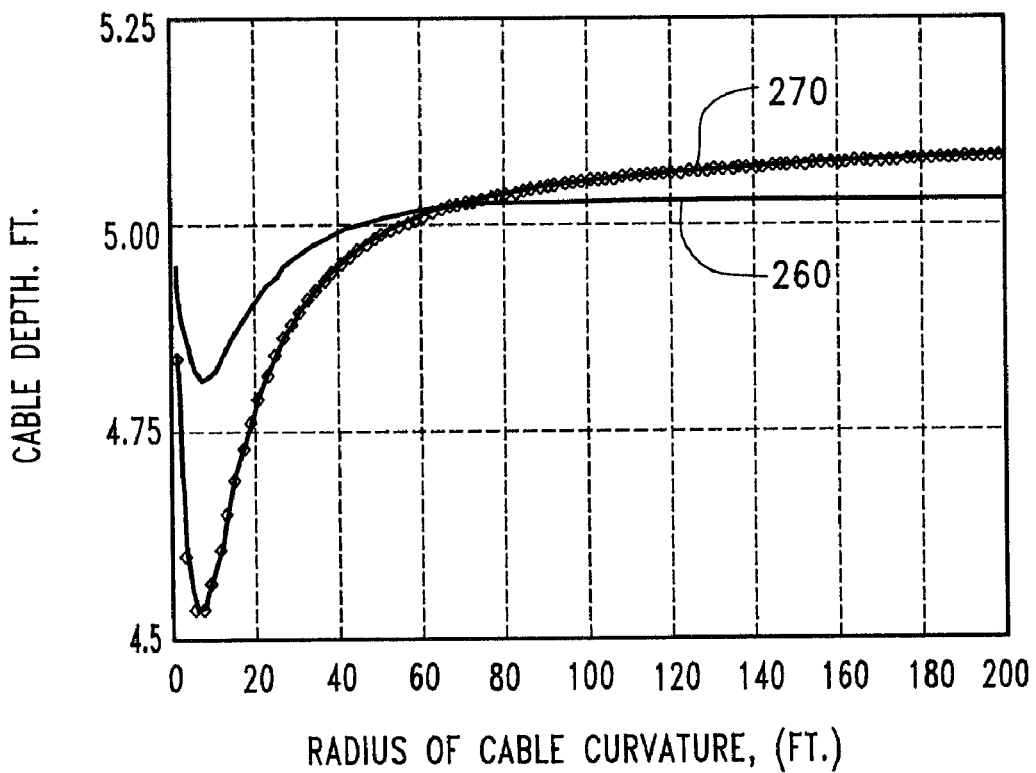
FIG. 21 plots cable depth against cable radius of curvature for a curved in-ground cable installed according to FIG. 13 having a range of radius of curvature from 0 to 200 feet, showing one plot determined using the two-point ground depth determination method of FIGS. 10 and 11 and another plot determined using the two-point height method of FIG. 8 for comparison of the plots.

Turning to FIG. 21, the two-point overhead method described with regard to FIG. 8 will now be considered in terms of depth measurement accuracy using equation (11) where the required fluxes are also obtained from the previously described model using the law of Biot-Savart for a curved cable. FIG. 21 includes a vertical axis showing cable depth and a horizontal axis showing radius of cable curvature. The actual cable depth is set to 5 feet. A plot 260 shows determined depth variation produced from cable curvature using results from the two-point ground method with measurements taken at x=+4.5 feet and −5.5 feet on the x axis of FIG. 13. A plot 270 is shown for determinations made using the two-point height of FIG. 8 wherein the height distance between the two points has a typical value of 18 inches. As seen in FIG. 21, the most significant difference between the two plots is seen in a particular range of somewhat smaller cable bend radii from approximately 0-40 feet, however, both methods provide generally accurate depth readings.

Figure 22:
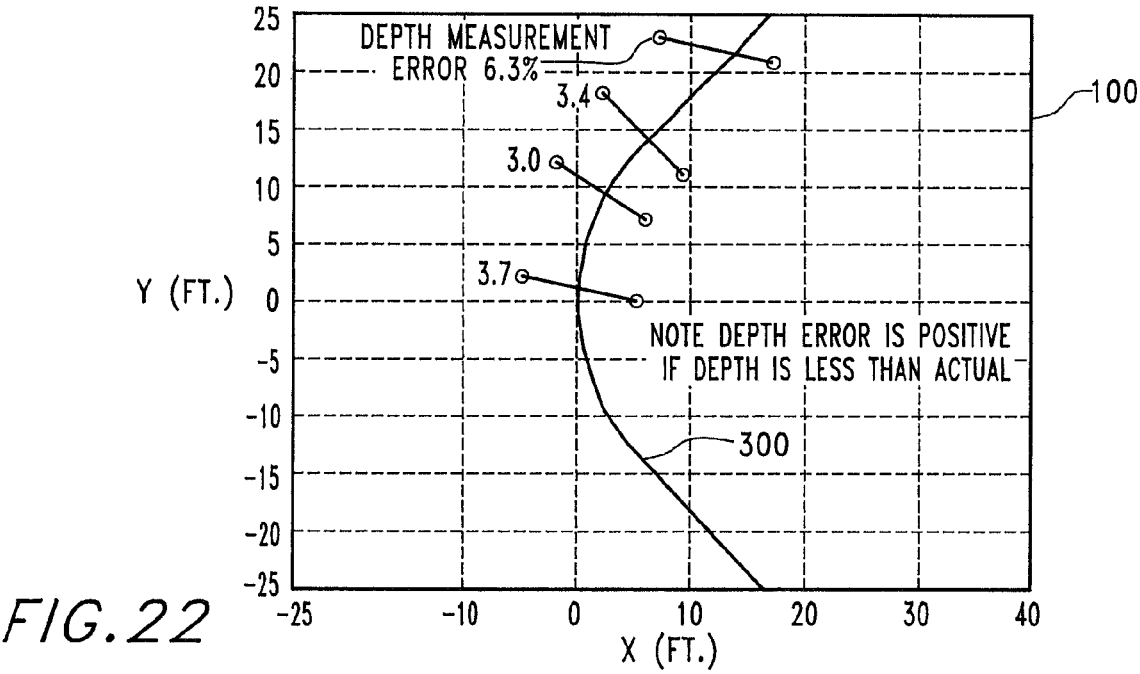
FIG. 22 is a plan view showing an in-ground cable buried at a depth of 5 feet and having a curved configuration within an xy coordinate system, shown here to illustrate two-point ground depth determination in accordance with the present invention at spaced apart positions along the cable length and indicating depth error associated with each pair of measurement points having the respective measurement points of each pair separated by approximately ten feet across the buried cable in plan view.

FIG. 22 illustrates a locating scenario in region 100 wherein a cable 300 is installed having a bend. Such situations are typical, for example around street corners or to avoid in-ground objects. Accordingly, it may be appropriate to make depth determinations at spaced apart positions along the length of the cable with respect to the bend. A series of four such measurements is shown to one side of the bend with measurements taken using the two-point ground depth determination method of the present invention. Measurements are made at points across the cable with respect to one another and separated by approximately ten feet. Each pair of points used in a measurement are interconnected by a line segment. Depth error is also indicated adjacent to each pair of measurement points. The cable bend radius is 20 feet while the cable depth is 5 feet.

Figure 23:
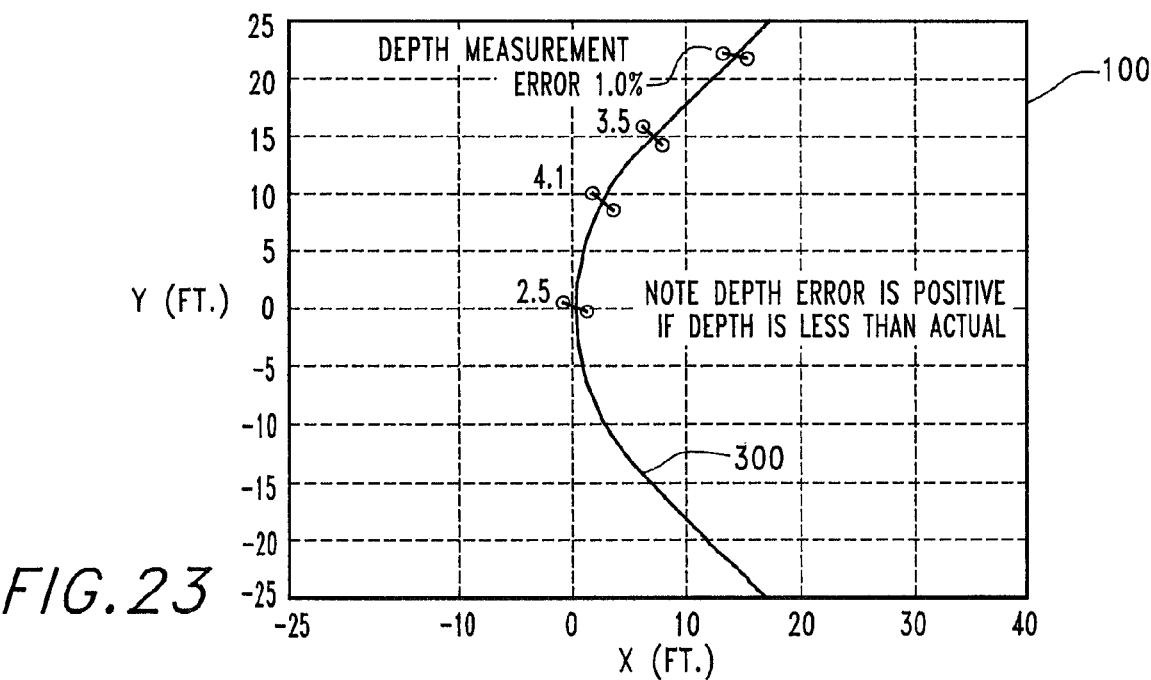
FIG. 23 is a diagrammatic plan view produced consistent with the view of FIG. 22 but with the respective measurement points of each pair separated by approximately two feet across the buried cable in plan view and also indicating depth error associated with each pair of measurement points.

FIG. 23 illustrates the locating scenario of FIG. 22 again showing cable 300. In this example, the pairs of points for use in the two-point ground depth determination method are arranged more closely together, for example, separated by approximately two feet across the cable. In this case, a depth error of less than 5% was exhibited for all measurements. While the points of each pair used in this example may be shown as being generally equidistant from the cable, it is to be understood that this is not a requirement.

Figure 24:
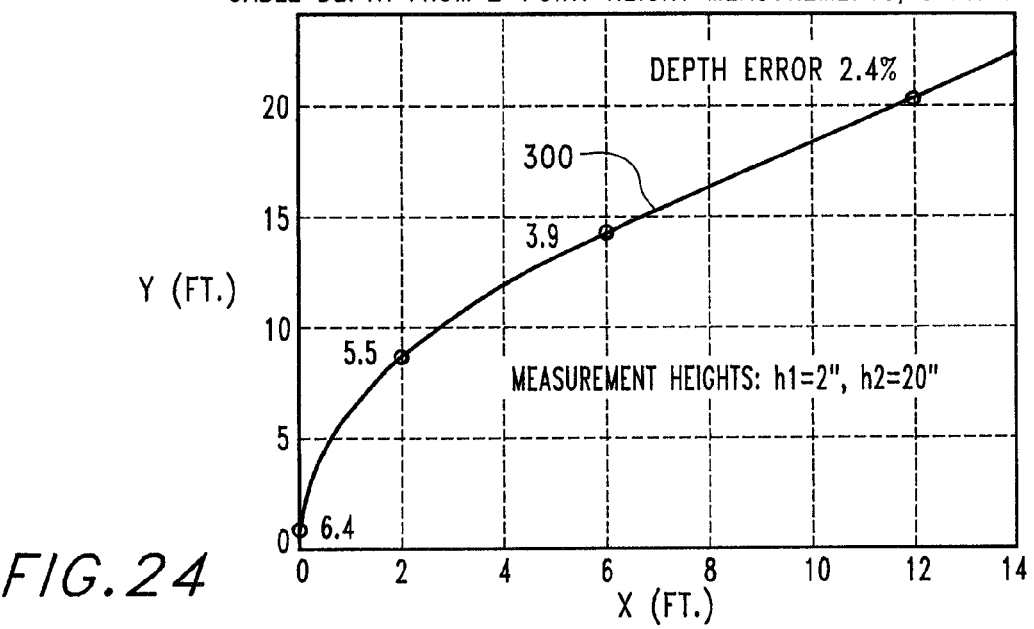
FIG. 24 is a diagrammatic plan view showing one-half of the cable of FIGS. 22 and 23, shown here to illustrate depth determinations made at spaced apart positions along the depicted length of the cable, including a depth error associated with each position, wherein the depth at each position is determined using the two point overhead method.

FIG. 24 illustrates the use of the two-point overhead height method for the locating scenario of FIG. 22 showing only one-half of cable 300 at an expanded vertical scale. As shown in FIG. 24, depth was determined at four spaced apart positions along the cable length using heights of 2 inches and 20 inches above the surface of the ground at each point. An error of less than 7% was seen across all of the positions, with increasing error as the bend was approached.

Having considered depth determination errors based on cable curvature, the effects of flux measurement error will now be addressed with regard to cable depth determination. The effects of this error on the two-point ground method of the present invention will initially be considered. In this regard, it is assumed that measurements are conducted in a direction normal to the plan view of the cable and the distance between the measurements points 1 and 2 of each pair of points is known exactly. Application of a standard error analysis technique to the depth measurement equation (17) yields the following closed form solution for the depth error $E_D$ as a function of flux measurement error $E_b$:

$$\frac{E_D}{D_c} = \sqrt{2} \frac{E_b}{b} \sqrt{\frac{x_1^2 + x_2^2}{(\Delta s)^2}} \quad (22)$$

Here the relative flux measurement errors $E_b/b$ of all flux components b are assumed to have the same value, typically about 2%. $x_1$ and $x_2$ are measurement positions spaced from overhead of the cable in plan view separated by distance $\Delta s$. It should be appreciated that the depth error is a minimum if, for a fixed distance $|\Delta s|=|x_1-x_2|$, the x-coordinates $x_1,x_2$ have the smallest possible values. However, this requires that points 1 and 2 are on opposite sides of the cable.

The effect of flux error on results obtained using the two-point overhead height method is now described. Again, this method relies on equation (11) to calculate depth from the measured horizontal fluxes and distances to the ground. Without loss of generality, it is assumed that the first measurement is taken on the ground surface itself ($h_1=0$). Furthermore, the location of the second point $h_2$ is assumed as known exactly. With these assumptions, a closed form solution for the depth error is found as a function of flux error:

$$\frac{E_D}{D_c} = \sqrt{2} \frac{E_b}{b} \left(1 + \frac{D_c}{h_2}\right) \quad (23)$$

It should be noted that in this case depth error, $E_D$, changes quadratically with depth, resulting in very large depth errors for practical values of $h_2$.

Figure 25:
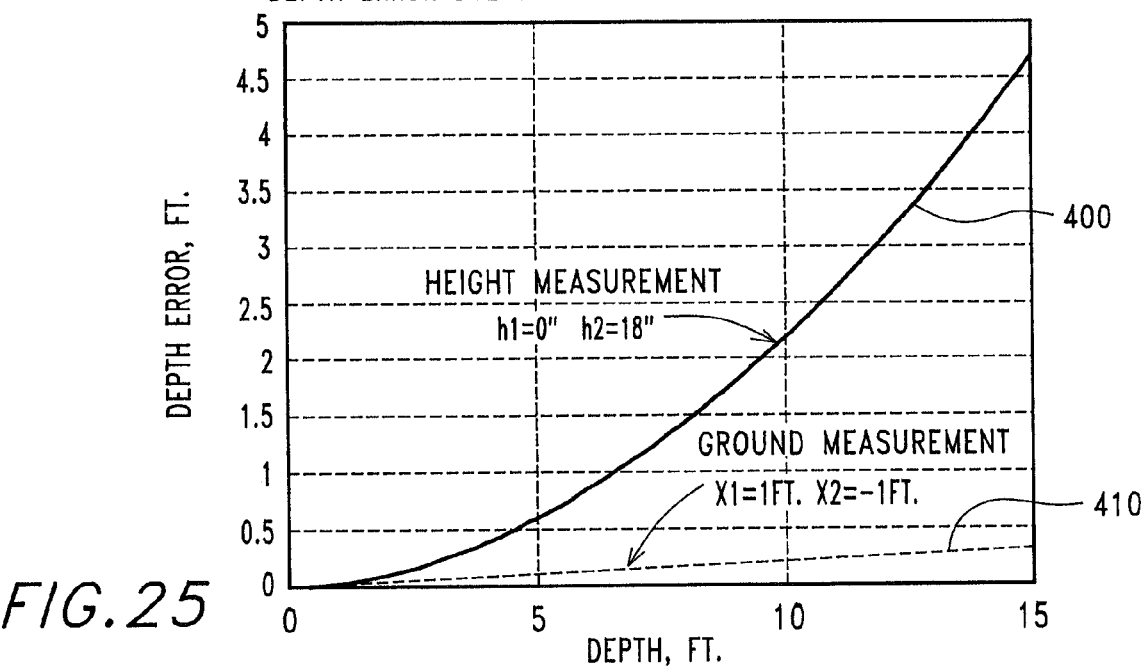
FIG. 25 shows depth error plotted against depth assuming a 2% flux measurement error, illustrating one plot made using depth readings taken using the two-point height method of FIG. 8 for comparison with another plot produced using the two-point ground depth determination method of FIGS. 10 and 11 which employs measurement point pairs having each point of an opposing pair on opposite sides of the cable for direct comparison of the plots.

Referring to FIG. 25, depth error based on flux measurement error is shown plotted against depth for the two-point height method, indicated as a plot 400 and for the two-point ground depth determination method, indicated as a plot 410. When directly compared, the two-point ground method of the present invention exhibits far less flux measurement error influence than the two-point height method with increasing depth. For example, at a depth of 10 feet and using $h_2=18$ inches the depth error is expected to exceed two feet for the two point height method: an error of over 40%. In contrast, the depth error for the two-point ground depth determination is an order of magnitude smaller. This is considered to be a remarkable and highly advantageous difference in and by itself.

It should be noted that the present invention is not limited to the embodiments and methods described herein since one having ordinary skill in the art may readily implement a wide range of modifications in view of the overall teachings herein. Therefore, the present examples are to be considered as illustrative and not restrictive, and the invention is not to be limited to the details given herein, but may be modified within the scope of the appended claims.

What is claimed is:

1. In a region which includes at least one generally straight inground cable extending across said region, from which cable a locating signal is transmitted, a method comprising the steps of:

measuring a local flux intensity, including three orthogonally opposed values, of the locating signal at an above ground point within said region using a portable locator; and using the local flux intensity to establish an approximate horizontal distance to the cable based on a vertically oriented component of the locating signal at the above ground point determined from the local flux intensity and a horizontally oriented component of the locating signal at the above ground point determined from the local flux intensity, which horizontally oriented component is generally normal to the cable in a plan view and represents a total flux intensity in a horizontal plane.

2. The method of claim 1 wherein the vertically oriented component of the locating signal is denoted as $b_w$ and the horizontally oriented component of the locating signal is denoted as $b_h$ and wherein the approximate horizontal distance is estimated based on an angle $\alpha$ determined by the expression:

$$\tan\alpha = \frac{b_w}{b_h}.$$

3. The method of claim 2 wherein the locator includes an axis of symmetry and wherein $b_h$ is given by $$b_h = b_u\sqrt{1+\left(\frac{b_v}{b_u}\right)^2}$$

where $b_u$ is measured along the axis of symmetry of the locator with the axis of symmetry horizontally oriented and $b_v$ is measured horizontally normal thereto.

4. The method of claim 2 wherein tan $\alpha$ includes a sign and said method includes the step of using the sign of $\alpha$ to establish whether the cable is ahead of or behind the locator.

5. The method of claim 2 further comprising the step of determining an angle $\gamma$ between a direction that is normal to the cable in a plan view and the locating direction given by the expression $$\tan\gamma = \frac{b_v}{b_u}$$

such that $\gamma$ establishes a relative direction of the cable from the locator at the above ground point with the locator oriented in the locating direction.

6. The method of claim 5 wherein said locator includes a display and wherein said method further comprises the step of displaying a positional relationship between the locator, oriented along said locating direction at the above ground point, and the cable based on $\gamma$ and $\alpha$.

7. In a system for use in a region which includes at least one generally straight inground cable extending across said region, from which cable a locating signal is transmitted a locator comprising:

a first arrangement for measuring a local flux intensity, including three orthogonally opposed values, of the locating signal at an above ground point;

a processing arrangement for using the local flux intensity to establish an approximate horizontal distance to the cable in a plan view based on a vertically oriented component of the locating signal at the above ground point determined from the local flux intensity and a horizontally oriented component of the locating signal at the above ground point determined from the local flux intensity, which horizontally oriented component is generally normal to the cable in a plan view and represents a total flux intensity in a horizontal plane.

8. The locator of claim 7 wherein the vertically oriented component of the locating signal is denoted as $b_w$ and the horizontally oriented component of the locating signal is denoted as $b_h$ and wherein the processing arrangement is configured for estimating the approximate horizontal distance based on an angle $\alpha$ determined by the expression:

$$\tan\alpha = \frac{b_w}{b_h}.$$

9. The locator of claim 8 including an axis of symmetry and wherein the processing arrangement is configured for determining $b_h$ using the expression $$b_h = b_u\sqrt{1+\left(\frac{b_v}{b_u}\right)^2}$$

where $b_u$ is measured along the axis of symmetry of the locator with the axis of symmetry horizontally oriented and $b_v$ is measured horizontally normal thereto.

10. The locator of claim 8 wherein the processing arrangement is configured for determining a sign of tan $\alpha$ and for using the sign of $\alpha$ to establish whether the cable is ahead of or behind the locator.

11. The locator of claim 8 wherein the processing arrangement is configured for determining an angle $\gamma$ between a direction that is normal to the cable in a plan view and the locating direction given by the expression $$\tan\gamma = \frac{b_v}{b_u}$$

such that $\gamma$ establishes a relative direction of the cable from the locator at the above ground point with the locator oriented in the locating direction.

12. The locator of claim 11 including a display and wherein said processing arrangement is configured for determining a positional relationship based on $\gamma$ and $\alpha$ for presentation on said display, said positional relationship including the locator oriented along said locating direction at the above ground point and the cable in a plan view.

* * * * *